US006792378B2

(12) United States Patent
Chen et al.

(10) Patent No.: US 6,792,378 B2
(45) Date of Patent: Sep. 14, 2004

(54) METHOD FOR TESTING I/O PORTS OF A COMPUTER MOTHERBOARD

(75) Inventors: Zhiguo Chen, Hsin-Tien (TW); Chih-Wei Huang, Hsin-Tien (TW); Chao-An Chen, Hsin-Tien (TW)

(73) Assignee: Via Technologies, Inc., Taipei (TW)

( * ) Notice: Subject to any disclaimer, the term of this patent is extended or adjusted under 35 U.S.C. 154(b) by 111 days.

(21) Appl. No.: 10/300,762

(22) Filed: Nov. 21, 2002

(65) Prior Publication Data

US 2004/0102916 A1 May 27, 2004

(51) Int. Cl.$^7$ ................................................ G06F 11/00
(52) U.S. Cl. ...................... 702/119; 702/118; 702/117; 702/80; 714/6; 714/15; 714/25; 711/202
(58) Field of Search .................... 702/80, 117, 11, 702/8, 119; 700/20, 21; 714/6, 7, 8, 15, 25

(56) References Cited

U.S. PATENT DOCUMENTS

| | | | | |
|---|---|---|---|---|
| 4,794,599 A | * | 12/1988 | Purcell et al. | 714/719 |
| 5,357,519 A | * | 10/1994 | Martin et al. | 714/25 |
| 5,572,669 A | * | 11/1996 | Sabapathi et al. | 714/45 |
| 5,630,048 A | * | 5/1997 | La Joie et al. | 714/25 |
| 5,646,509 A | * | 7/1997 | Berglund et al. | 713/321 |
| 6,304,983 B1 | * | 10/2001 | Lee et al. | 714/48 |
| 6,385,739 B1 | * | 5/2002 | Barton et al. | 714/25 |
| 6,633,999 B1 | * | 10/2003 | Lee | 714/30 |
| 6,643,798 B2 | * | 11/2003 | Barton et al. | 714/25 |

* cited by examiner

Primary Examiner—Kamini Shah
(74) Attorney, Agent, or Firm—Rabin & Berdo, P.C.

(57) ABSTRACT

A method for testing I/O ports of a computer motherboard under test. A non-volatile memory on the computer motherboard under test is provided with a test code for initializing the computer motherboard and testing its I/O ports, in which the test code includes a plurality of test routines corresponding to the I/O ports to be tested. Upon power-up or reboot, the computer motherboard under test is booted from the test code in the non-volatile memory. One of the I/O ports is selected from an interactive display menu, and then a CPU on the computer motherboard under test executes the corresponding test routine for the selected I/O port to test it. If there is an abnormal signal pin in the selected I/O port, a failure message is displayed to indicate which signal pin of the selected I/O port is not operating correctly. Otherwise, a pass message is displayed.

48 Claims, 21 Drawing Sheets

196

198

METHOD FOR TESTING I/O PORTS OF A COMPUTER MOTHERBOARD

BACKGROUND OF THE INVENTION

1. Field of the Invention

The invention relates to testing computer motherboards. More particularly, the invention relates to a method for testing various I/O ports of a computer motherboard.

2. Description of the Related Art

While a central processing unit (CPU) performs most computer jobs, it is really a motherboard that brings it all together to turn a CPU into a modern personal computer. Typically, a computer motherboard includes many input/output (I/O) ports for connecting to various peripherals, and these I/O ports are arranged on the personal computer. It is necessary to test every I/O port of the computer motherboard as much as feasible during design phase or in the final stages of manufacture. Some limited functional tests can be performed by a basic input-output system (BIOS) routine. The BIOS is low-level software that controls devices on the motherboard. The CPU executes the BIOS code upon power-up or reboot, where the BIOS code is stored in a system non-volatile memory on the computer motherboard. The BIOS typically first runs a power-up self-test (POST), which is a series of diagnostic tests to ensure the basic hardware is operating properly. The BIOS also initializes basic hardware operations and some basic video functions. The BIOS then searches for and initiates an operating system, such as Microsoft Windows or Linux.

It is often convenient to execute extensive diagnostic test applications under a window-based operating system so as to test various elements of the computer. Unfortunately, there are several disadvantages to testing the I/O ports of the motherboard as described above. The BIOS code does provide some I/O testing at the system level, but its diagnostic capability is limited. Any messages typically provided, for example, only indicate that a problem exists, but rarely identify what the problem is or where it is. Also, the motherboard under test must load an operating system from a storage device in order to execute diagnostic programs, which takes a significant amount of time. The above schemes for testing I/O ports of a computer motherboard are complicated and time consuming. Further, there is no integrated methodology for testing frequently used I/O ports on today's personal computers.

Accordingly, what is needed is a test method for effectively testing frequently used I/O ports of a computer motherboard. The test method should be simple to allow rapid testing of the I/O ports on the basis of the each I/O port's characteristics. Furthermore, the test method should preferably be accurate to indicate which pin of an abnormal I/O port is not operating properly.

SUMMARY OF THE INVENTION

The present invention is generally directed to a method for testing I/O ports of a computer motherboard. According to one aspect of the invention, a non-volatile memory on the computer motherboard is first provided with a test code for initializing the computer motherboard and testing its I/O ports. The test code includes a plurality of test routines corresponding to the I/O ports. Upon power-up or reboot, the computer motherboard is booted from the test code in the non-volatile memory. Thereafter, various I/O ports of the motherboard under test are listed on a display menu. According to the invention, there is no need to load an operating system. After selecting one of the I/O ports to be tested from the display menu, the corresponding test routine for the selected I/O port is executed to test the signal pins on the basis of the selected I/O port's characteristics. If every signal pin of the selected I/O port is operating correctly, a pass message is displayed. Otherwise, a failure message is displayed to indicate which signal pin of the selected I/O port is not operating correctly.

According to another aspect of the invention, a computer motherboard under test includes a CPU and a non-volatile memory for storing a BIOS code. The first step of the inventive method is to provide the non-volatile memory with a test code instead of the BIOS code for initializing the computer motherboard and testing its I/O ports. Note that the test code includes a plurality of test routines corresponding to the I/O ports. Upon power-up or reboot, the CPU is booted from the test code in the non-volatile memory whereby the CPU executes the test code to test the I/O ports of the computer motherboard. Subsequently, various I/O ports of the motherboard under test are listed on a display menu. According to the invention, there is no need to load an operating system. After interactively selecting one of the I/O ports to be tested from the display menu, the corresponding test routine for the selected I/O port is executed to test the signal pins on the basis of the selected I/O port's characteristics. If every signal pin of the selected I/O port is operating properly, a pass message is displayed. If there is an abnormal signal pin in the selected I/O port, a failure message is displayed to indicate which signal pin of the selected I/O port is not operating properly.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
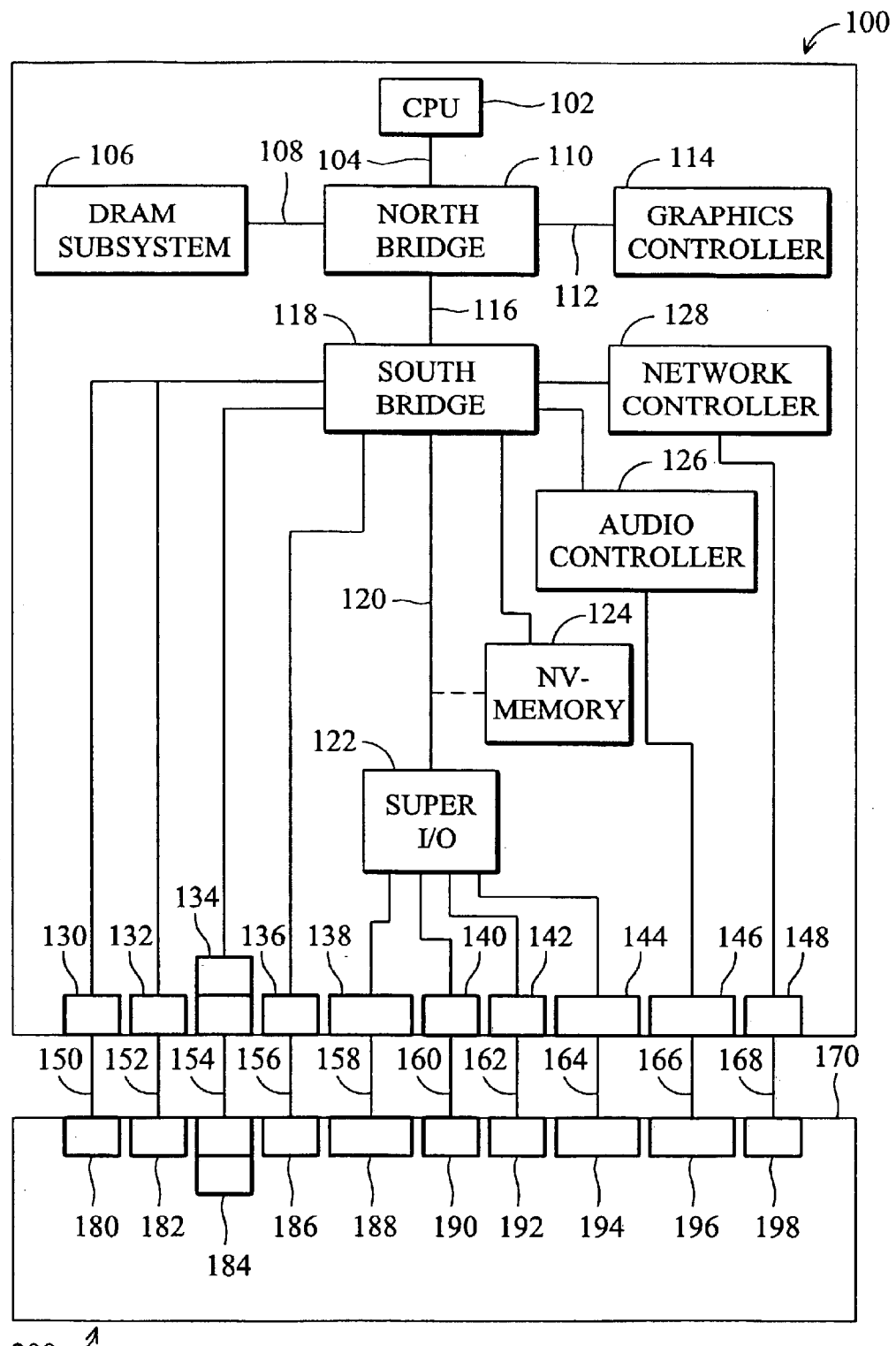
FIG. 1 is a block diagram illustrating a test apparatus connected to an exemplary computer motherboard under test according to the invention.

FIG. 1 shows a block diagram illustrating a test apparatus 200 of the invention connected to an exemplary computer motherboard 100. The exemplary computer motherboard 100 includes a chipset containing two main components—the North Bridge 110 and the South Bridge 118. The term "Bridge" comes from a reference to a device that connects multiple buses together. The North Bridge 110 acts as the connection point for a CPU 102, a DRAM subsystem 106, a graphics controller 114 and the South Bridge 118. It connects a front side bus (FSB) 104 of the CPU 102 to a DRAM bus 108, an AGP graphics bus 112, and a dedicated interconnection 116 for the South Bridge 118. In its simplest form, the South Bridge 118 integrates various I/O controllers, provides interfaces to peripheral devices and buses, and transfers data to/from the North Bridge 110 through the dedicated interconnection 116. There are a number of I/O ports 130–148 on the motherboard 100 for connecting to peripherals. For example, the South Bridge 118 may implement the keyboard and PS/2 mouse controller, the integrated USB controller and the integrated IEEE 1394 controller to support a keyboard port 130, a PS/2 mouse port 132, two USB ports 134 and an IEEE 1394 port 136, respectively. An onboard Super I/O chip 122 is connected to the South Bridge 118 through a Low Pin Count (LPC) bus 120, which supports a parallel port 138, two serial ports 140 and 142, as well as a game port 144. The South Bridge 118 may provide a special interface to an audio controller 126 in order to offer an audio port 146. The audio port 146 includes a microphone input (MIC_IN), a stereo line output (LINE_OUT_L and LINE_OUT_R) and a stereo line input (LINE_IN_L and LINE_INR). Further, a network port 148 is driven by a network controller 128 that typically links to the South Bridge 118 through a PCI bus. In addition, a non-volatile memory (NV-memory) 124 may be directly, or through the LPC bus 120, connected to the South Bridge 118, which normally stores low-level software called BIOS. The present invention, however, is not limited to any particular type of computer motherboard.

Still referring to FIG. 1, a plurality of test modules 180–198 are integrated into a circuit board 170 which is a main part of the test apparatus 200 for testing corresponding I/O ports. These modules include a test module 180 for the keyboard port, a test module 182 for the PS/2 mouse port, a test module 184 for the USB ports, a test module 186 for the IEEE 1394 port, a test module 188 for the parallel port, test modules 190 and 192 for the serial ports, a test module 194 for the game port, a test module 196 for the audio port, and a test module 198 for the network port. Prior to a test, the test apparatus 200 is connected to the I/O ports 130–148 of the motherboard 100 under test through appropriate cables 150–168 to the corresponding test modules 180–198 on the test apparatus 200. In an alternative embodiment, the test apparatus 200 may be directly attached to the I/O ports of the motherboard 100 under test. When performing related tests, the NV-memory 124 on the computer motherboard 100 under test is provided with a test code instead of the BIOS code to initialize the motherboard 100 and test its I/O ports in accordance with the invention. The test apparatus 200 incorporating the test code of the invention is called the universal test kit, and the computer motherboard 100 is hereinafter referred to as the device under test (DUT) for brevity.

Figure 2A:
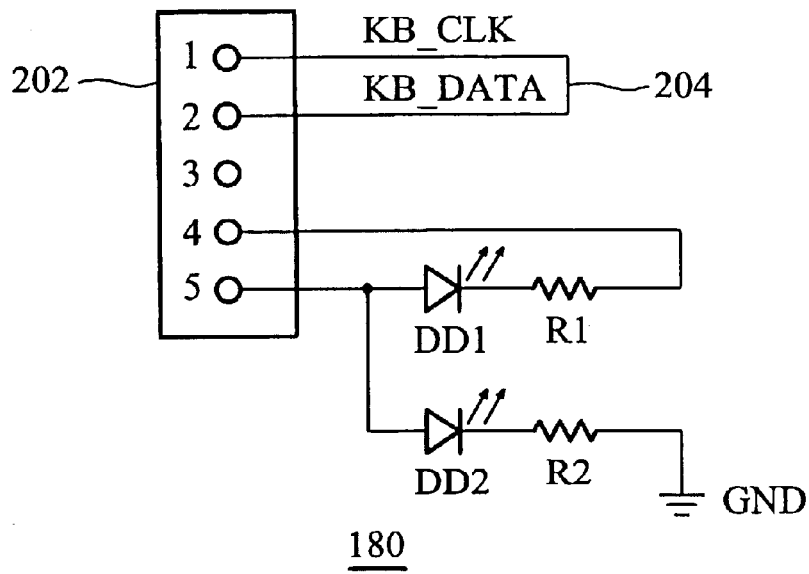
FIG. 2A is a schematic diagram illustrating a circuit for testing a keyboard port of the computer motherboard under test.

Referring to FIGS. 2A–2I, more detailed schematic diagrams corresponding to the test modules integrated in the test apparatus 200 are illustrated. The test module 180 for the keyboard port is constructed of a keyboard connector 202 as shown in FIG. 2A. The keyboard connector 202 is electrically connected to the circuit board 170, and it is used to establish electrical connections with corresponding pins of the keyboard port 130 of the DUT 100. According to the typical keyboard connector pin assignment, the KB_CLK signal at pin 1 of the connector 202 is fed back as the KB_DATA signal at pin 2 of the connector 202, i.e. the keyboard interface clock pin (pin 1) is coupled to the keyboard interface data pin (pin 2) to form a loop-back connection 204. In addition, pins 4 and 5 of the connector 202 are signal ground and power pins, respectively. As depicted, a light emitting diode (LED) DD1 and a resistor R1 are connected in series between the pin 5 and the pin 4 of the keyboard connector 202, and an LED DD2 and a resistor R2 are connected in series between the pin 5 of the connector 202 and system ground GND. In this way, the diodes DD1 and DD2 can indicate whether the pins 4 and 5 are normal.

Figure 2B:
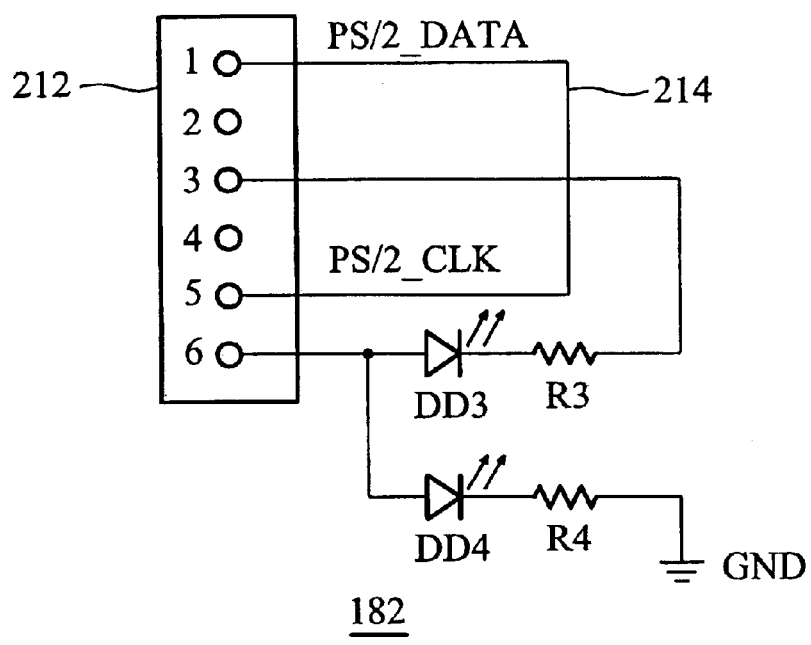
FIG. 2B is a schematic diagram illustrating a circuit for testing a PS/2 mouse port of the computer motherboard under test.

Referring now to FIG. 2B, the test module 182 for the PS/2 mouse port is constructed of a PS/2 mouse connector 212. The PS/2 mouse connector 212 is electrically connected to the circuit board 170, and it is provided to establish electrical connections with corresponding pins of the PS/2 mouse port 132 of the DUT 100. According to the typical PS/2 mouse connector pin assignment, the PS/2_CLK signal at pin 5 of the connector 212 is fed back as the PS/2_DATA signal at pin 1 of the connector 212, i.e. the PS/2 interface clock pin (pin 5) is coupled to the PS/2 interface data pin (pin 1) to form a loop-back connection 214. Furthermore, pins 3 and 6 of the connector 212 are signal ground and power pins, respectively. As depicted, an LED DD3 and a resistor R3 are connected in series between the pin 6 and the pin 3 of the PS/2 mouse connector 212, and an LED DD4 and a resistor R4 are connected in series between the pin 6 of the connector 212 and system ground GND. The diodes DD3 and DD4 are used to indicate whether the pins 3 and 6 are normal.

Figure 2C:
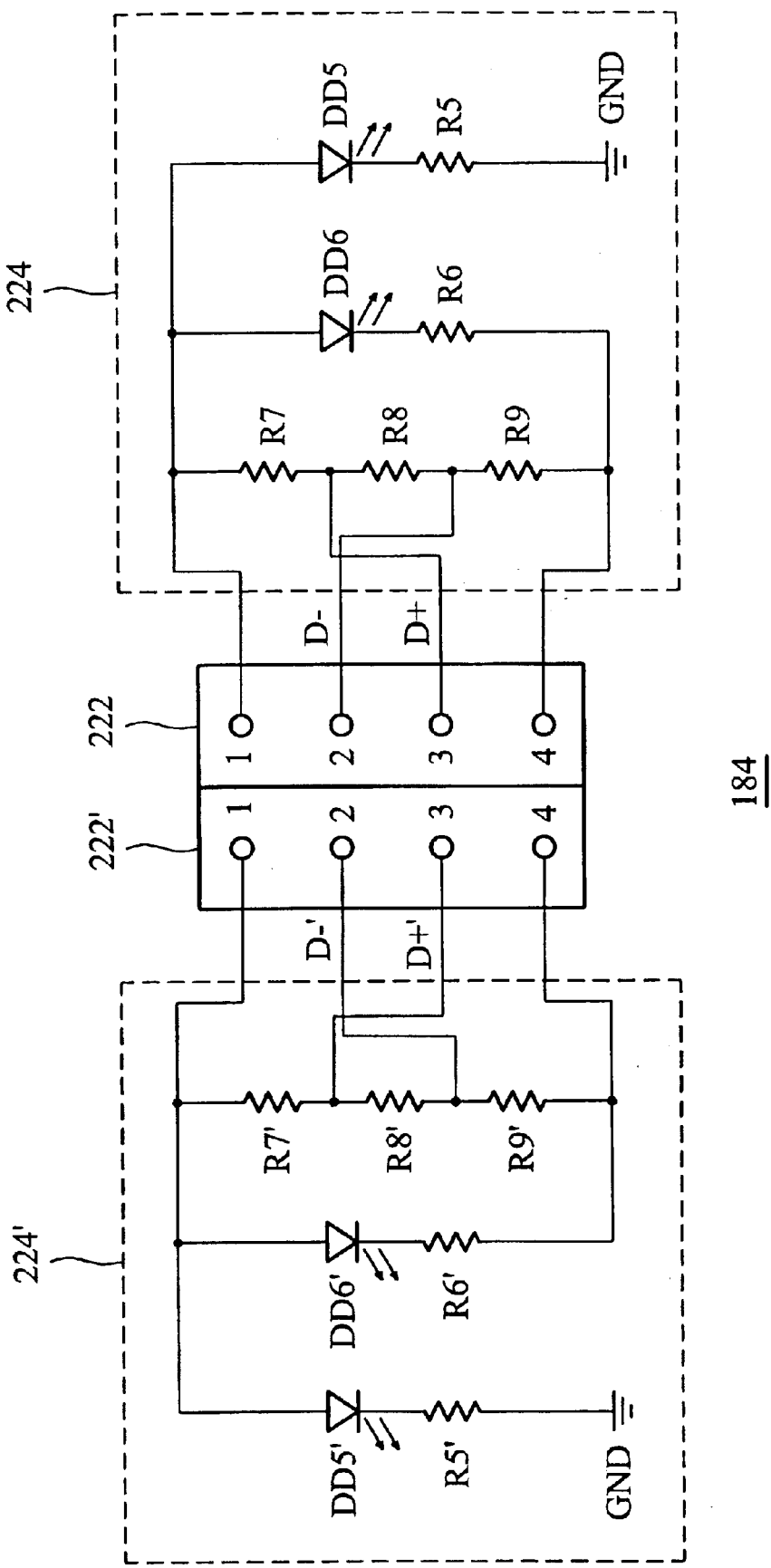
FIG. 2C is a schematic diagram illustrating a circuit for testing USB ports of the computer motherboard under test.

Referring to FIG. 2C, the test module 184 for two USB ports includes a first USB connector 222 and its associated test circuit 224, as well as a second USB connector 222' and its associated test circuit 224'. The USB connectors 222 and 222' are electrically connected to the circuit board 170, and they establish electrical connections with corresponding pins of those two USB ports 134 of the DUT 100. According to the typical USB connector pin assignment, pins 2, 3 of the USB connector 222 provide a pair of USB interface differential data signals D− and D+. Additionally, pin 1 of the USB connector 222 is a power pin to receive a power supply source and pin 4 of the connector 22 is a ground pin to serve as signal ground. In the test circuit 224, a resistor R7 is connected between pin 1 of the USB connector 222 and the D+ pin (pin 3) of the USB connector 222, and a resistor R9 is connected between pin 4 of the USB connector 222 and the D− pin (pin 2) of the USB connector 222. Also, a resistor R8 is connected between pins 2 and 3 of the USB connector 222. As depicted, the resistors R7, R8 and R9 are connected in series. To indicate whether the pins 1 and 4 are normal, an LED DD6 and a resistor R6 are connected in series between the pin 1 and the pin 4 of the USB connector 222, and an LED DD5 and a resistor R5 are connected in series between the pin 1 of the connector 222 and system ground GND. Likewise, the second USB connector 222' and its associated test circuit 224' are arranged in the same manner as shown in FIG. 2C. Since the IEEE 1394 port features high-speed differential signal pairs like the USB port, the test module 186 for the IEEE 1394 port may have similar arrangements as the test module 184 by the principles of the invention.

Figure 2D:
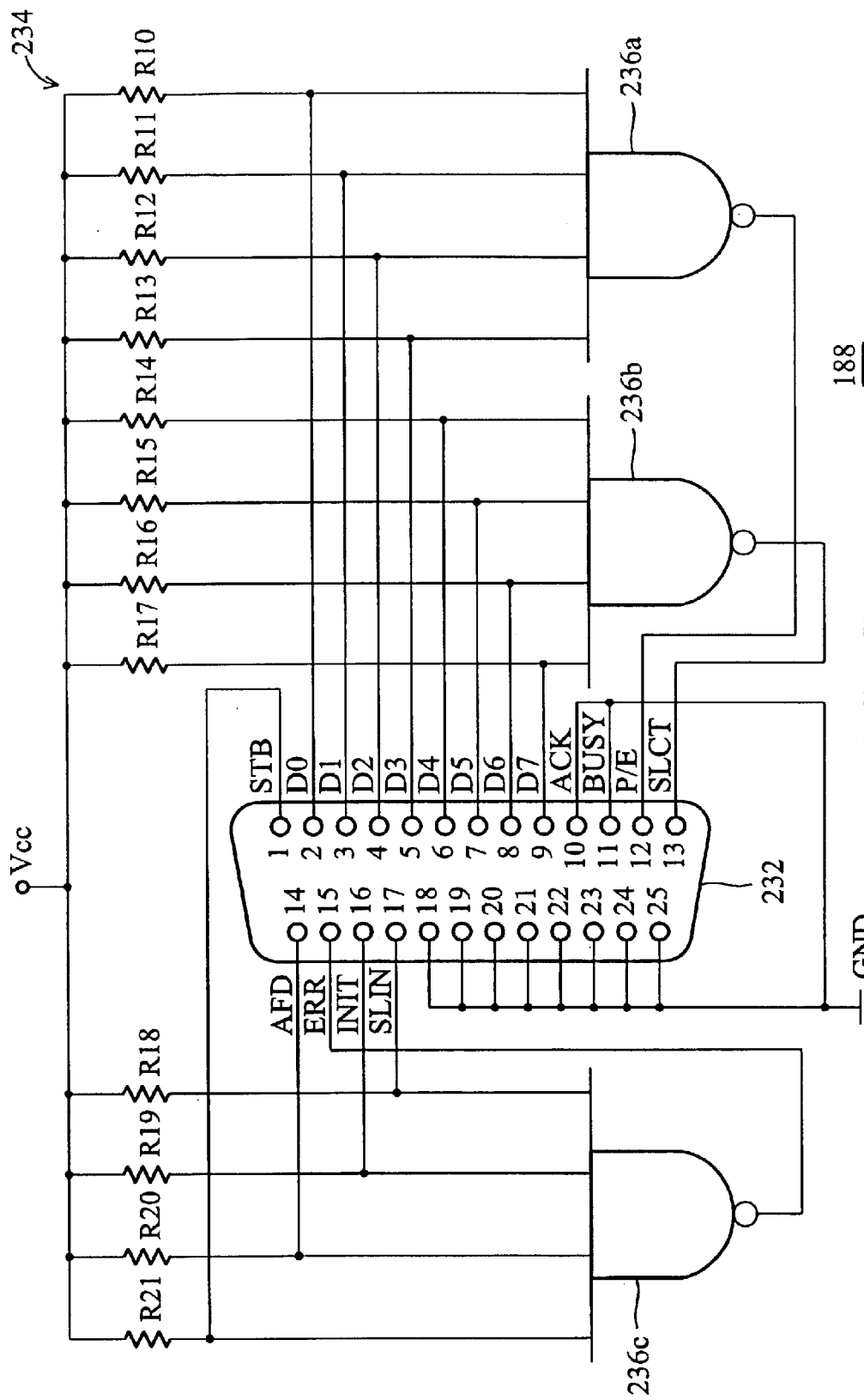
FIG. 2D is a schematic diagram illustrating a circuit for testing a parallel port of the computer motherboard under test.

Turning now to FIG. 2D, the test module 186 for the parallel port includes a 25-pin D-shell type connector 232 and its associated test circuit 234. The connector 232 is electrically connected to the circuit board 170, and it is provided to establish electrical connections with corresponding pins of the parallel port 136 of the DUT 100. It includes 8 parallel interface data pins, 5 parallel interface status pins and 4 parallel interface control pins. According to the typical pin assignment for a parallel port, pins 2~9 of the connector 232 carry data signals D0~D7, pin 1, 14, 16 and 17 of the connector 232 respectively carry control signals STB, AFD, INIT and SLIN, as well as pins 10~13, 15 of the connector 232 respectively carry status signals ACK, BUSY, P/E, SLCT and ERR. The test circuit 234 comprises NAND gates 236a~236c. In one embodiment, the NAND gates 236a~236c may constitute a logic device. As depicted, the NAND gate 236a has its inputs respectively coupled to the parallel interface data pins D0~D3 (pins 2~5 of the connector 232), and its output coupled to the PAPER END (P/E) status pin (pin 12 of the connector 232). The NAND gate 236a logically operates its inputs and provides a logical-NAND result at its output to feed the pin 12 of the connector 232. The NAND gate 236b has its inputs respectively coupled to the parallel interface data pins D4~D7 (pins 6~9 of the connector 232), and its output coupled to the SELECT (SLCT) status pin (pin 13 of the connector 232). The NAND gate 236b logically operates its inputs and provides a logical-NAND result at its output to feed the pin 13 of the connector 232. Similarly, the NAND gate 236c has its inputs respectively coupled to the STROBE (STB), AUTO FEED (AFD), INIT and SLIN control pins (pins 1, 14, 16 and 17 of the connector 232), and its output coupled to the ERROR (ERR) status pin (pin 15 of the connector 232). The NAND gate 236c logically operates its inputs and provides a logical-NAND result at its output to feed the pin 15 of the connector 232. All inputs of the NAND gates 236a~236C are coupled to a system power supply Vcc by way of pull-up resistors R10~R21. Moreover, the test circuit 234 electrically couples the ACK and BUSY status pins (pins 10 and 11 of the connector 232) to system ground.

Figure 2E:
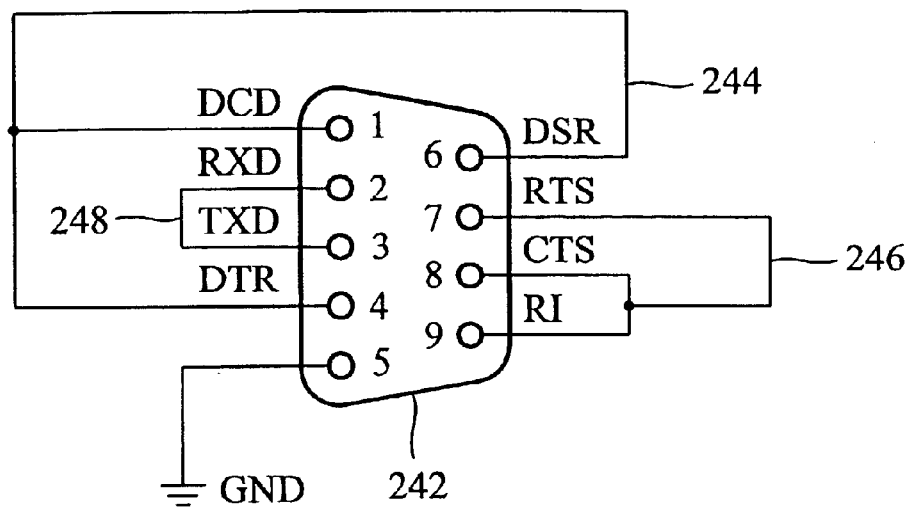
FIGS. 2E and 2F are schematic diagrams illustrating circuits for testing two serial ports of the computer motherboard under test.
Figure 2F:
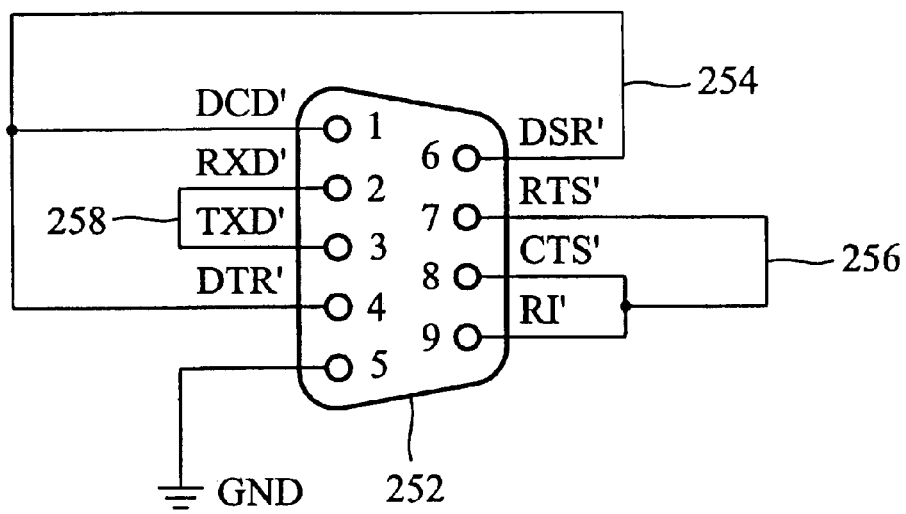

Referring to FIG. 2E, the test module 190 for the serial port is constructed of a 9-pin D-shell type connector 242. The connector 242 is electrically connected to the circuit board 170, and it is provided to establish electrical connections with corresponding pins of the serial port 140 of the DUT 100. It includes one serial data output pin, one serial data input pin, 4 serial interface status pins and 2 serial interface control pins. According to the typical connector pin assignment for a serial port, the DTR signal at pin 4 of the connector 242 is fed back as the DCD signal at pin 1 and the DSR signal at pin 6 of the connector 242, i.e. the serial interface control pin DTR (pin 4) is coupled to the serial interface status pins DCD and DSR (pin 1 and pin 6) together to form a loop-back connection 244. As well, the RTS signal at pin 7 of the connector 242 is fed back as the CTS signal at pin 8 and the RI signal at pin 9 of the connector 242, i.e. the serial interface control pin RTS (pin 7) is coupled to the serial interface status pins CTS and RI (pin 8 and pin 9) together to form a loop-back connection 246. In addition, the TXD signal at pin 3 of the connector 242 is fed back as the RXD signal at pin 2 of the connector 242, i.e. the serial data output pin TXD (pin 3) is coupled to the serial data input pin RXD (pin 2) to form a loop-back connection 248. Note that pin 5 of the connector 242 is coupled to system ground GND. As illustrated in FIG. 2F, the test module 192 for another serial port is arranged in the say way.

Figure 2G:
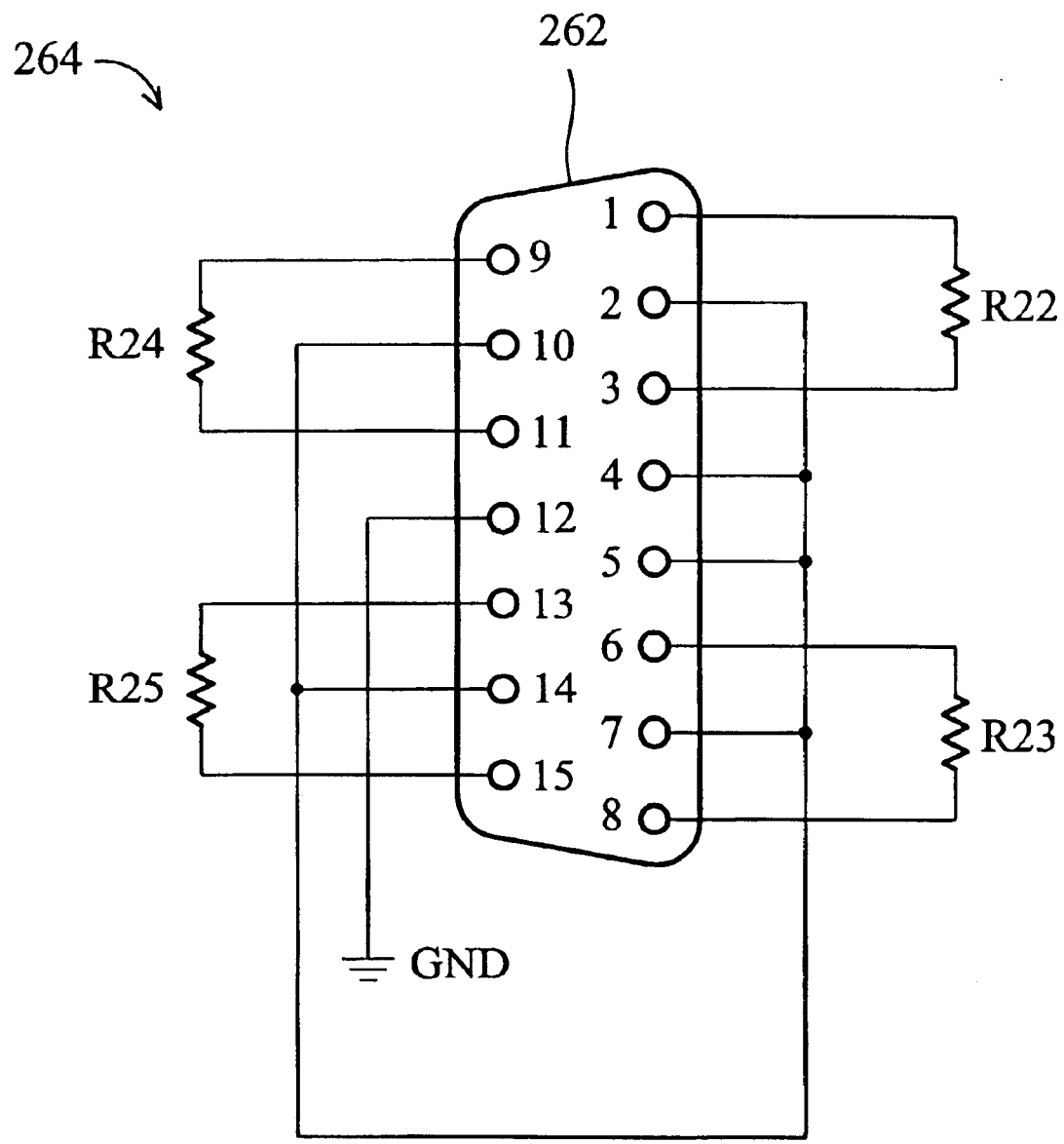
FIG. 2G is a schematic diagram illustrating a circuit for testing a game port of the computer motherboard under test.

Referring to FIG. 2G, the test module 194 for the game port includes a 15-pin D-shell type connector 262 and its associated test circuit 264. The connector 262 is electrically connected to the circuit board 170, and it establishes electrical connections with corresponding pins of the game port 144 of the DUT 100. According to the typical connector pin assignment for a game port, pins 2 and 14 of the connector 262 receive respective first button signals, pins 7 and 10 receive respective second button signals, pins 3 and 11 receive respective X-axis position signals, and pins 6 and 13 receive respective Y-axis position signals. In addition, pins 1, 8, 9 and 15 of the connector 262 are power pins to receive a power supply source and pins 4, 5, 12 of the connector 262 are ground pins to serve as signal ground. The test circuit 264 is used to couple a portion of the game interface pins on the connector 262 to the power supply source and couple the other portion of the game interface pins on the connector 262 to ground. In other words, a pull-up resistor R22 is connected between pins 1 and 3 of the connector 262, a pull-up resistor R23 is connected between pins 6 and 8 of the connector 262, a pull-up resistor R24 is connected between pins 9 and 11 of the connector 262, and a pull-up resistor R25 is connected between pins 13 and 15 of the connector 262. Furthermore, pins 2, 7, 10 and 14 are connected together to pins 4 and 5 thereby coupling them to signal ground. Note that pin 12 of the connector 262 is coupled to system ground GND.

Figure 2H:
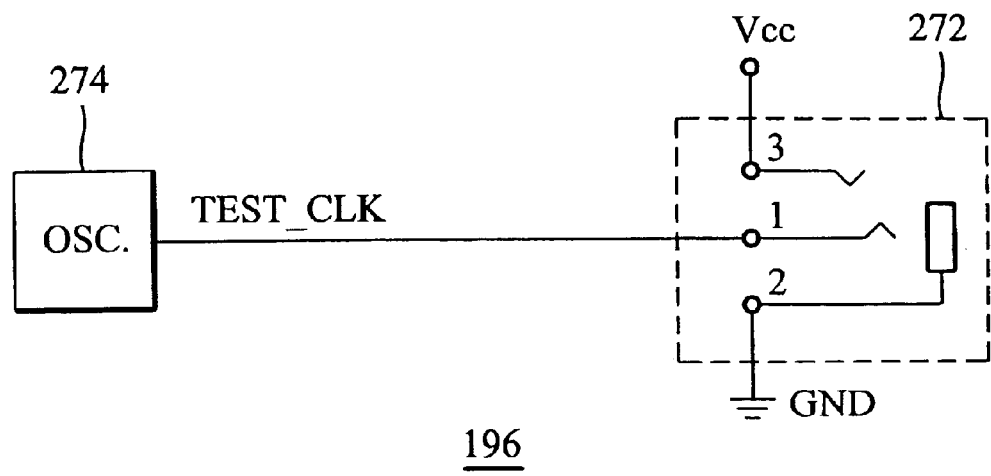
FIG. 2H is a schematic diagram illustrating a circuit for testing an audio port of the computer motherboard under test.

Referring to FIG. 2H, the test module 196 for the audio port includes an audio connector 272 and an oscillator 274. The connector 272 is electrically connected to the circuit board 170, and it establishes electrical connections with corresponding pins of the audio port 146 of the DUT 100. Preferably, the connector 272 is a microphone jack having a pin (pin 1 of the connector 272) as an audio interface pin. As depicted, the other pins of the connector 272 are coupled to the GND and Vcc, respectively. The oscillator 274 has an output coupled to the audio interface pin of the audio connector 272. The oscillator 274 generates a clock as the test signal TEST_CLK and provides it to the audio interface pin of the connector 272.

Figure 2I:
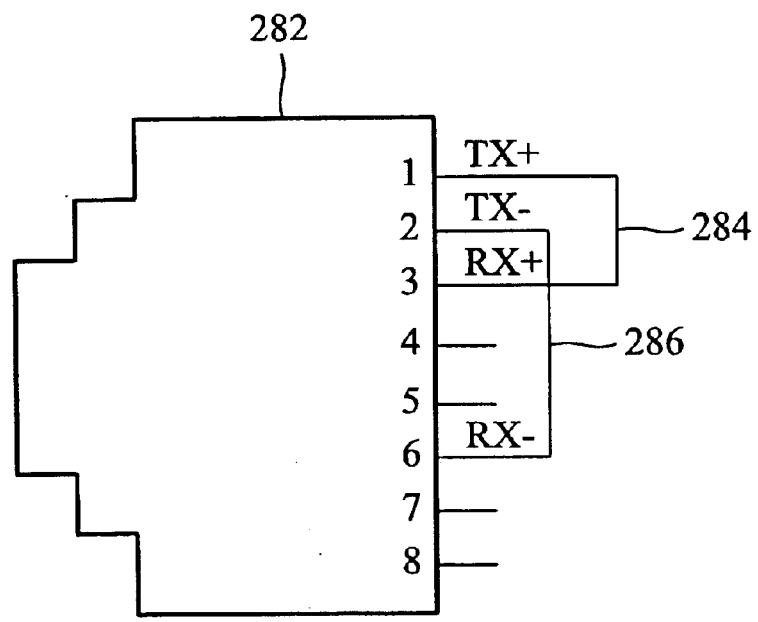
FIG. 2I is a schematic diagram illustrating a circuit for testing a network port of the computer motherboard under test.

Referring to FIG. 2I, the test module 198 for the network port is constructed of a RJ-45 connector 282. The connector 282 is electrically connected to the circuit board 170, and it is provided to establish electrical connections with corresponding pins of the network port 148 of the DUT 100. According to the typical connector pin assignment for a network port, pins 1, 2 of the connector 282 form a pair of transmit pins TX+ and TX−, and pins 3, 6 of the connector 282 form a pair of receive pins RX+ and RX−. As shown in FIG. 2I, the transmit pair are correspondingly coupled to the receive pair. That is, the TX+ pin (pin 1 of the connector 282) is coupled to the RX+ pin (pin 3 of the connector 282) to form a loop-back connection 284, and the TX− pin (pin 2 of the connector 282) is coupled to the RX− pin (pin 6 of the connector 282) to form a loop-back connection 286.

Figure 3:
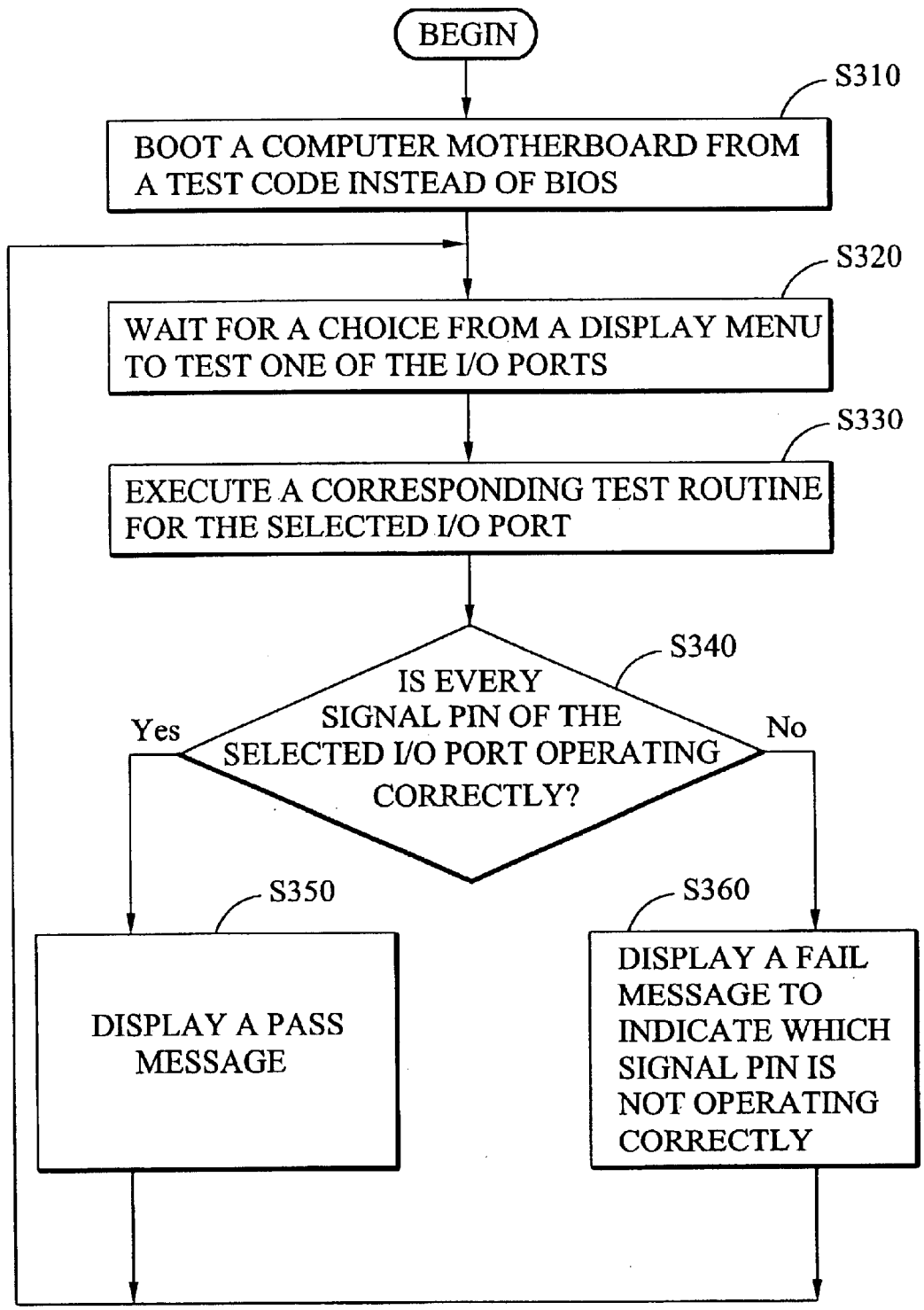
FIG. 3 is a flowchart illustrating a main procedure for testing the computer motherboard according to the invention.

Turning now to FIG. 3, a flowchart illustrating a main procedure for testing the DUT 100, after the DUT 100 and the test apparatus 200 of the invention are powered up, the CPU 102 on the DUT 100 is booted from the test code in the NV-memory 124 whereby the CPU 102 executes the test code to test the I/O ports 130~148 of the DUT 100 (step S310). In the meantime, just the needed components of the DUT 100, such as the NB 110, the DRAM subsystem 106, the graphics controller 114 and the SB 118, are initialized prior to testing. Additionally, the CPU 102 transfers all or certain portions of the test code from the NV-memory 124 to the DRAM subsystem 106 in order to accelerate the test process. Thereafter, a menu is displayed to prompt a choice to test one of the I/O ports (step S320). According to the invention, there is no need to load an operating system. Operation then proceeds to step S330, where the CPU 102 executes a corresponding test routine for the selected I/O port to test the signal pins on the basis of the selected I/O port's characteristics. Operation then proceeds to step S340, where the status of each pin of the selected I/O port is determined. If every signal pin of the selected I/O port is operating properly, a pass message is displayed (step S350). If there is an abnormal signal pin in the selected I/O port, a failure message is displayed to indicate which signal pin of the selected I/O port is not operating properly (step S360). After step S350 or step S360, operation returns to step S320 to wait for another choice to initiate the next test routine.

Figure 4:
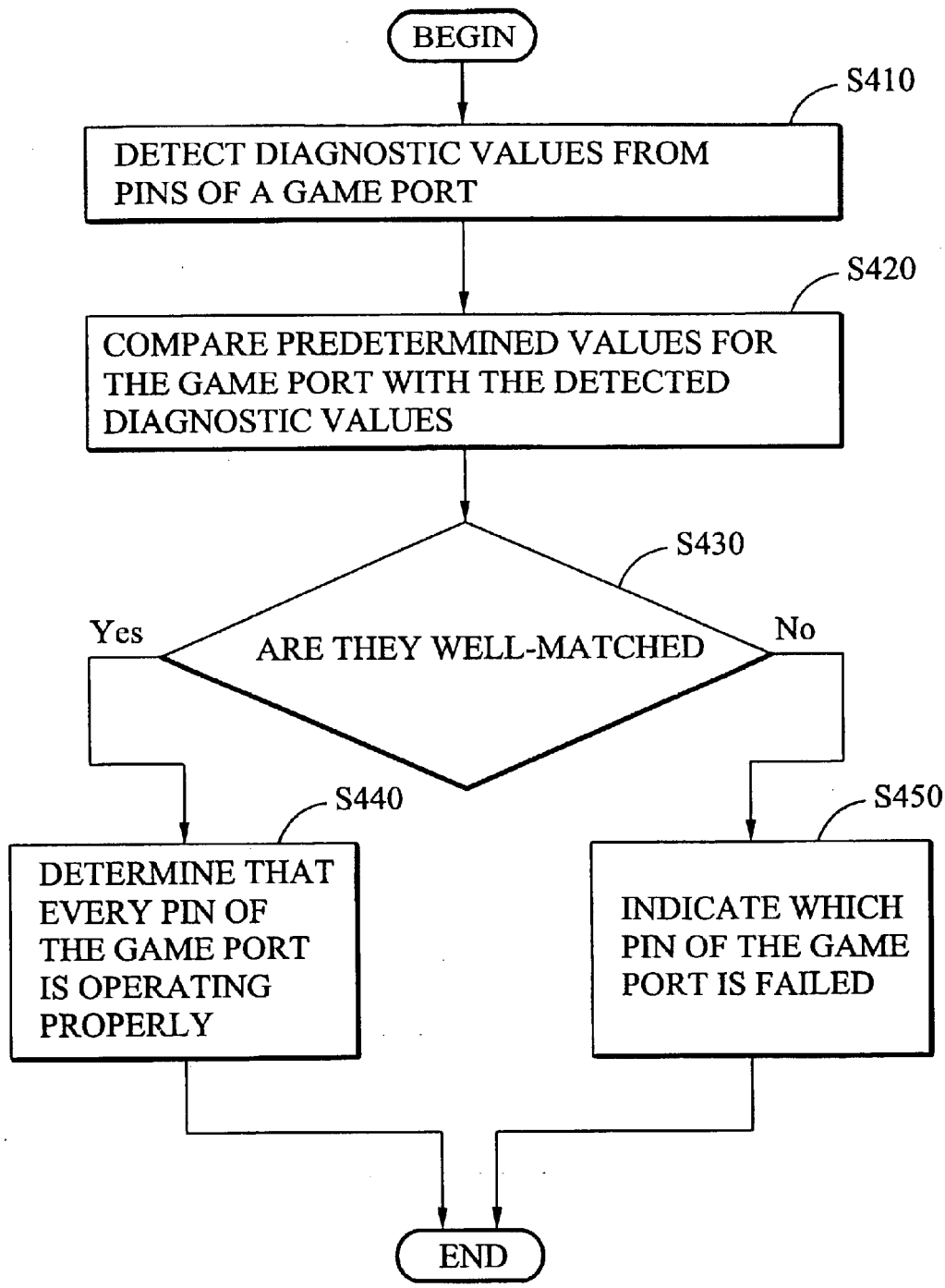
FIG. 4 is a flowchart illustrating the primary operational steps executed by a test routine for testing the game port.

A brief discussion of each of the test routines included in the test code will now be described. If the game port 144 of the DUT 100 is selected, the corresponding test routine for a game port is performed. Referring to FIG. 4, an I/O base address for the game port 144 is initialized and a memory block allocated from the game port I/O base address is read to detect diagnostic values from pins of the game port 144 (step S410). Note that there are game port registers within the memory block allocated from the game port I/O base address. Every game interface pin of the game port 144 is then checked with corresponding bits in the memory block, where the bits directly reflect the current status of the game interface pins. Further, the corresponding bits in the memory block are compared with predetermined values set externally for the respective game interface pins of the game port (step S420). Since pins 3, 6, 11 and 13 of the game port 144 are pulled up by the test module 194 on the test apparatus 200 as illustrated in FIG. 2G, the predetermined values for these pins are set to logic '1'. Also, pins 2, 7, 10 and 14 of the game port 144 are pulled down by the test module 194 on the test apparatus 200, the predetermined values for these pins are set to logic '0'. Operation then proceeds to step S430, where a comparison between the detected diagnostic values and the predetermined values is determined. If the predetermined values match the detected diagnostic values that are represented by the corresponding bits in the memory block, all of the game interface pins are reported as operating correctly (step S440). Otherwise, the test routine indicates which pin of the game port 144 has failed (step S450).

Figure 5A:
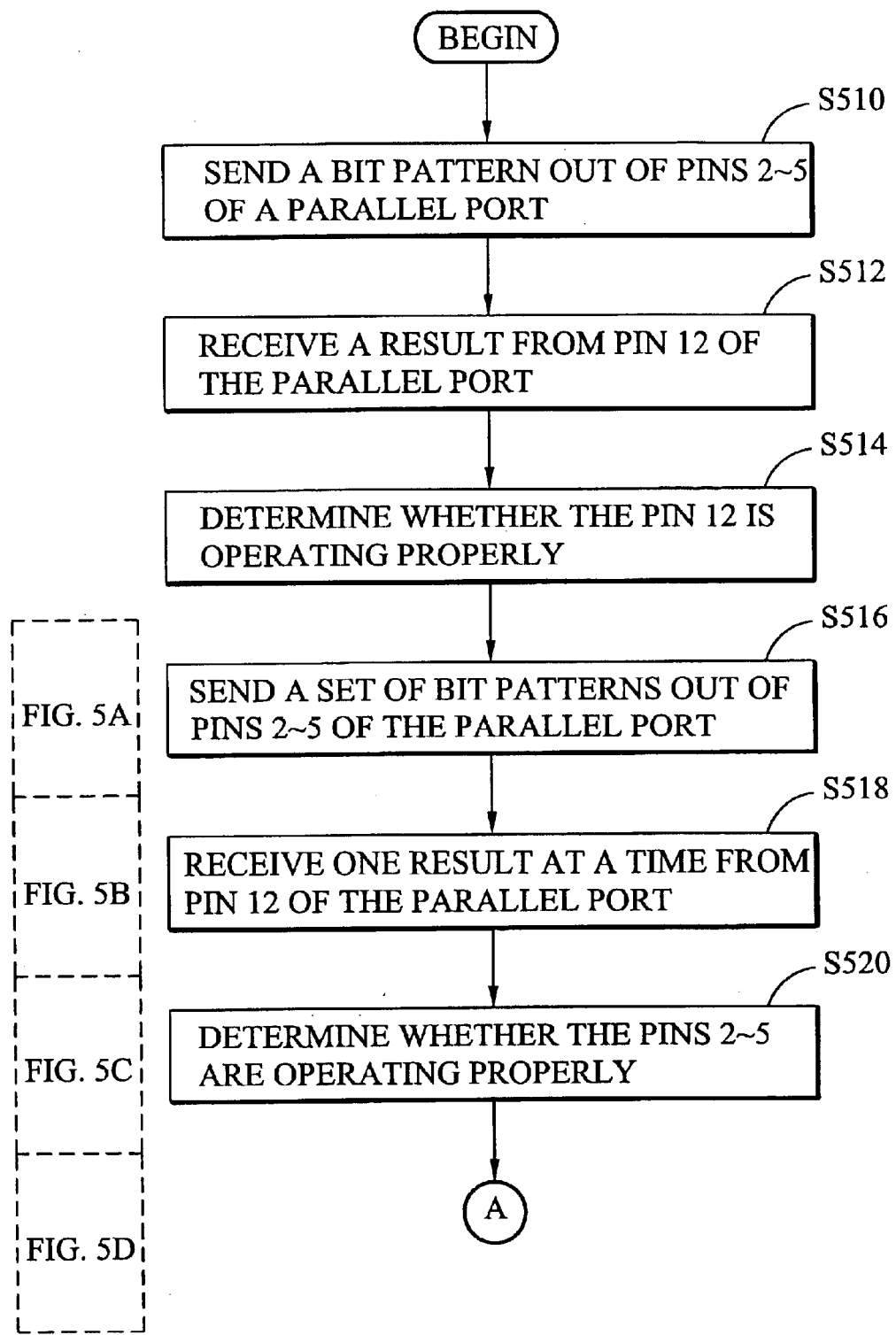
FIGS. 5A–5D show a flowchart illustrating the primary operational steps executed by another test routine for testing the parallel port.

If the parallel port 138 of the DUT 100 is selected, the corresponding test routine for a parallel port is performed. First, an I/O base address for the parallel port 138 is initialized. Note that there are parallel port registers within a memory block allocated from the parallel port I/O base address. Referring to FIG. 5A, a first bit pattern is written to a first portion of data bits in the memory block corresponding to the parallel interface data pins D0~D3 of the parallel port. In this way, the first bit pattern is sent out of the parallel port's pins 2~5 (step S510). After a predetermined time, a P/E status bit in the memory block corresponding to the PAPER END (P/E) status pin is read to receive a result from pin 12 of the parallel port 138 (step S512). With the test module 188 on the test apparatus 200, pins 2~5 of the parallel port 138 are logically operated to feed a logical-NAND result back to the pin 12 of the parallel port 138 as illustrated in FIG. 2D. Therefore, the P/E status pin (pin 12) is verified based on the logical relationship between the P/E status bit read from the memory block and the first bit pattern (step S514). Operation then proceeds to step S516, where a set of second bit patterns are written one at a time to the first portion of data bits in the memory block to sequentially send the set of second bit patterns out of the parallel port's pins 2~5. After the predetermined time, the P/E status bit in the memory block is read to receive one logical-NAND result at a time from pin 12 of the parallel port 138 (step S518). The above steps S516 and S518 are repeated to check each of the data pins including D0~D3 based on the logical relationship between the corresponding second bit pattern and the P/E status bit that is read each time in step S518 (step S520).

Figure 5B:
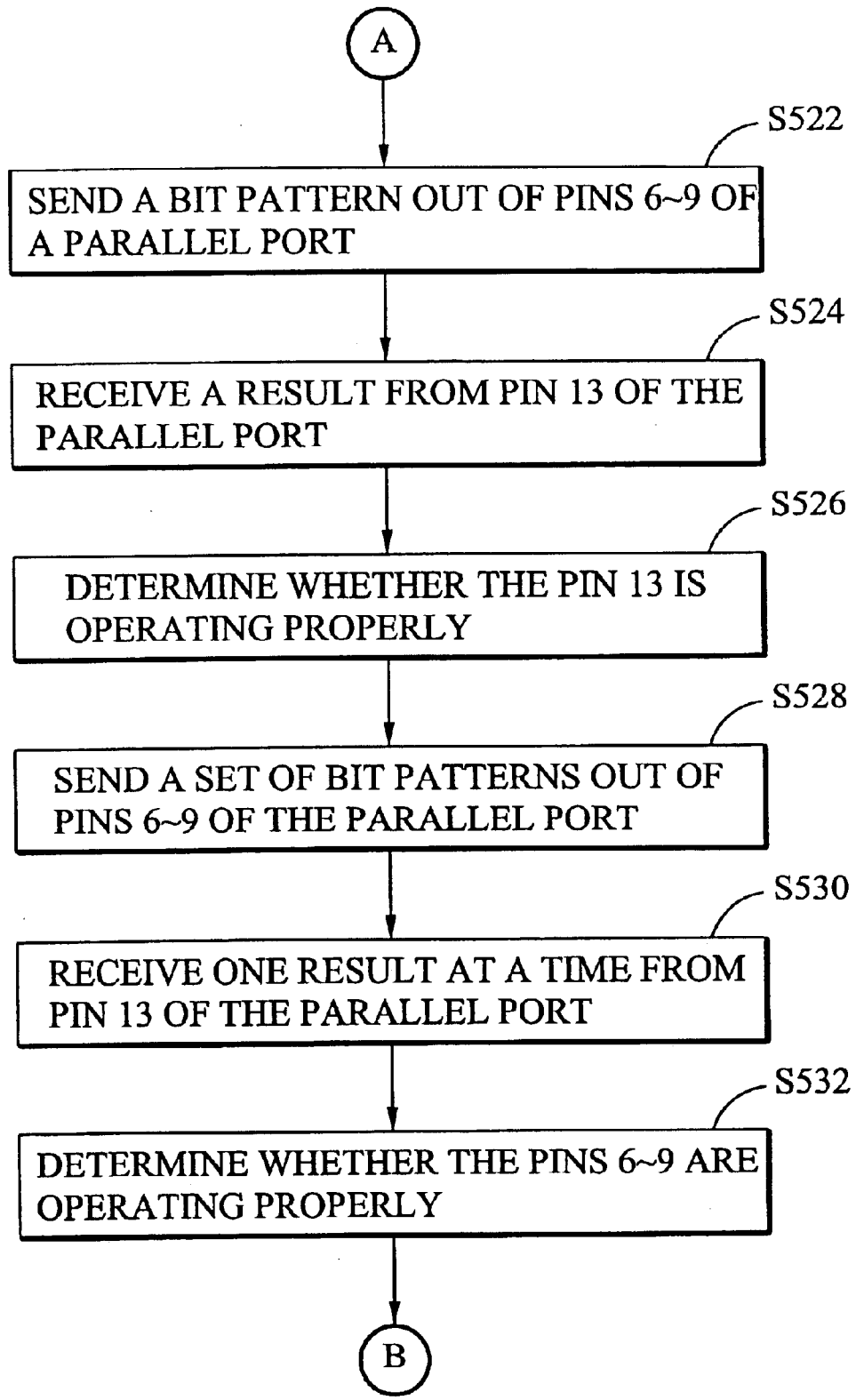

Referring to FIG. 5B, the first bit pattern is written to a second portion of data bits in the memory block corresponding to the parallel interface data pins D4~D7 of the parallel port. In this way, the first bit pattern is sent out of the parallel port's pins 6~9 (step S522). After the predetermined time, a SLCT status bit in the memory block corresponding to the SELECT (SLCT) status pin is read to receive a result from pin 13 of the parallel port 138 (step S524). With the test module 188 on the test apparatus 200, pins 6 9 of the parallel port 138 are logically operated to feed a logical-NAND result back to the pin 13 of the parallel port 138 as illustrated in FIG. 2D. Consequently, the SLCT status pin (pin 13) is verified based on the logical relationship between the SLCT status bit read from the memory block and the first bit pattern (step S526). Operation then proceeds to step S528, where the set of second bit patterns are written one at a time to the second portion of data bits in the memory block to sequentially send the set of second bit patterns out of the parallel port's pins 6~9. After the predetermined time, the SLCT status bit in the memory block is read to receive one logical-NAND result at a time from pin 13 of the parallel port 138 (step S530). The above steps S528 and S530 are repeated to check each of the data pins including D4~D7 based on the logical relationship between the corresponding second bit pattern and the SLCT status bit that is read each time in step S530 (step S532).

Figure 5C:
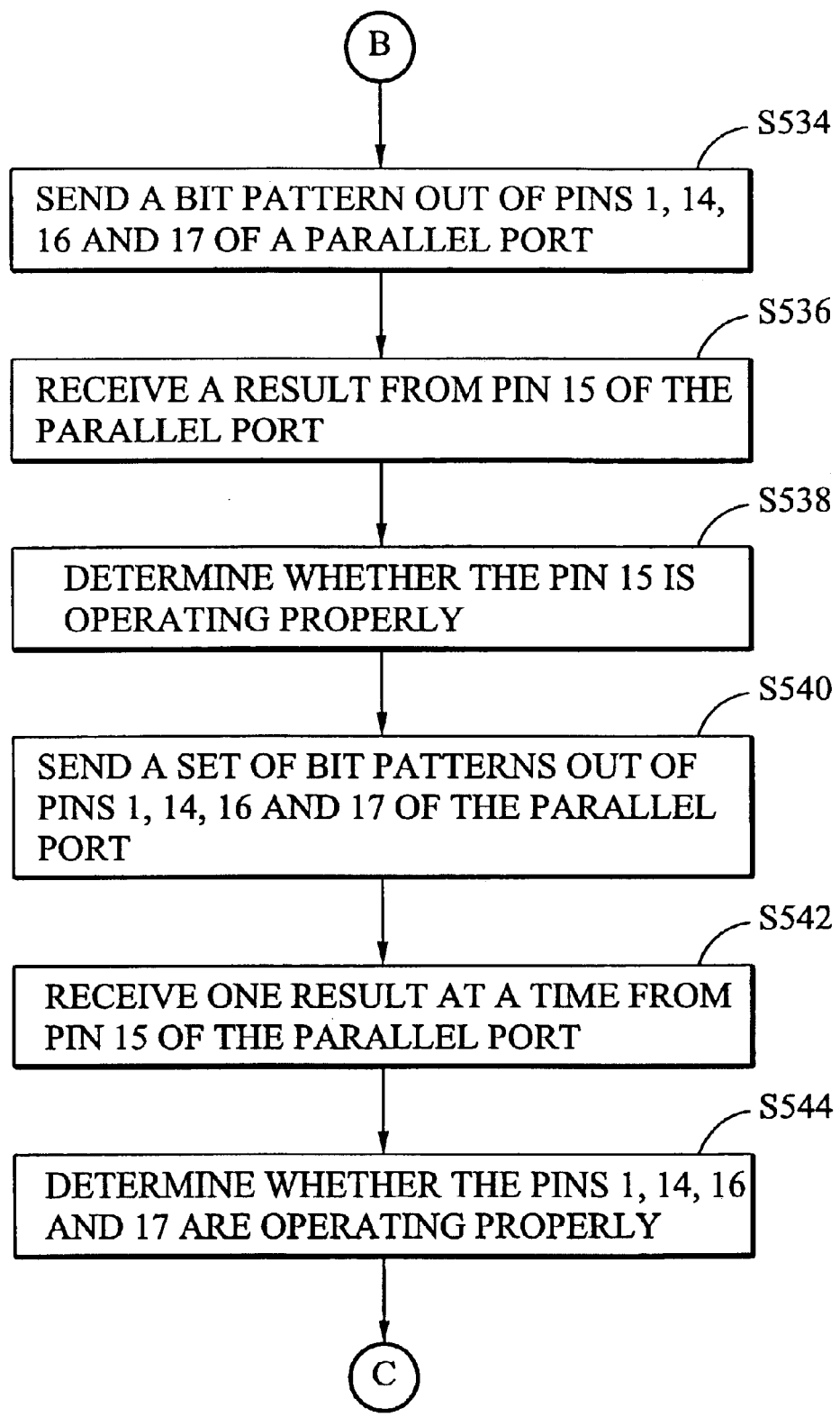

Referring to FIG. 5C, the first bit pattern is written to a set of control bits in the memory block corresponding to the STROBE (STB), AUTO FEED (AFD), INIT and SLIN control pins of the parallel port. In this way, the first bit pattern is sent out of the parallel port's pins 1, 14, 16 and 17

(step S534). After the predetermined time, an ERR status bit in the memory block corresponding to the ERROR (ERR) status pin is read to receive a result from pin 15 of the parallel port 138 (step S536). With the test module 188 on the test apparatus 200, pins 1, 14, 16 and 17 of the parallel port 138 are logically operated to feed a logical-NAND result back to the pin 15 of the parallel port 138 as illustrated in FIG. 2D. As a result, the ERR status pin (pin 15) is verified based on the logical relationship between the ERR status bit read from the memory block and the first bit pattern (step S538). Operation then proceeds to step S540, where the set of second bit patterns are written one at a time to the set of control bits in the memory block to sequentially send the set of second bit patterns out of the parallel port's pins 1, 14, 16 and 17. After the predetermined time, the ERR status bit in the memory block is read to receive one logical-NAND result at a time from pin 15 of the parallel port 138 (step S542). The above steps S540 and S542 are repeated to check each of the control pins including STB, AFD, INIT and SLIN based on the logical relationship between the corresponding second bit pattern and the ERR status bit that is read each time in step S542 (step S544).

Figure 5D:
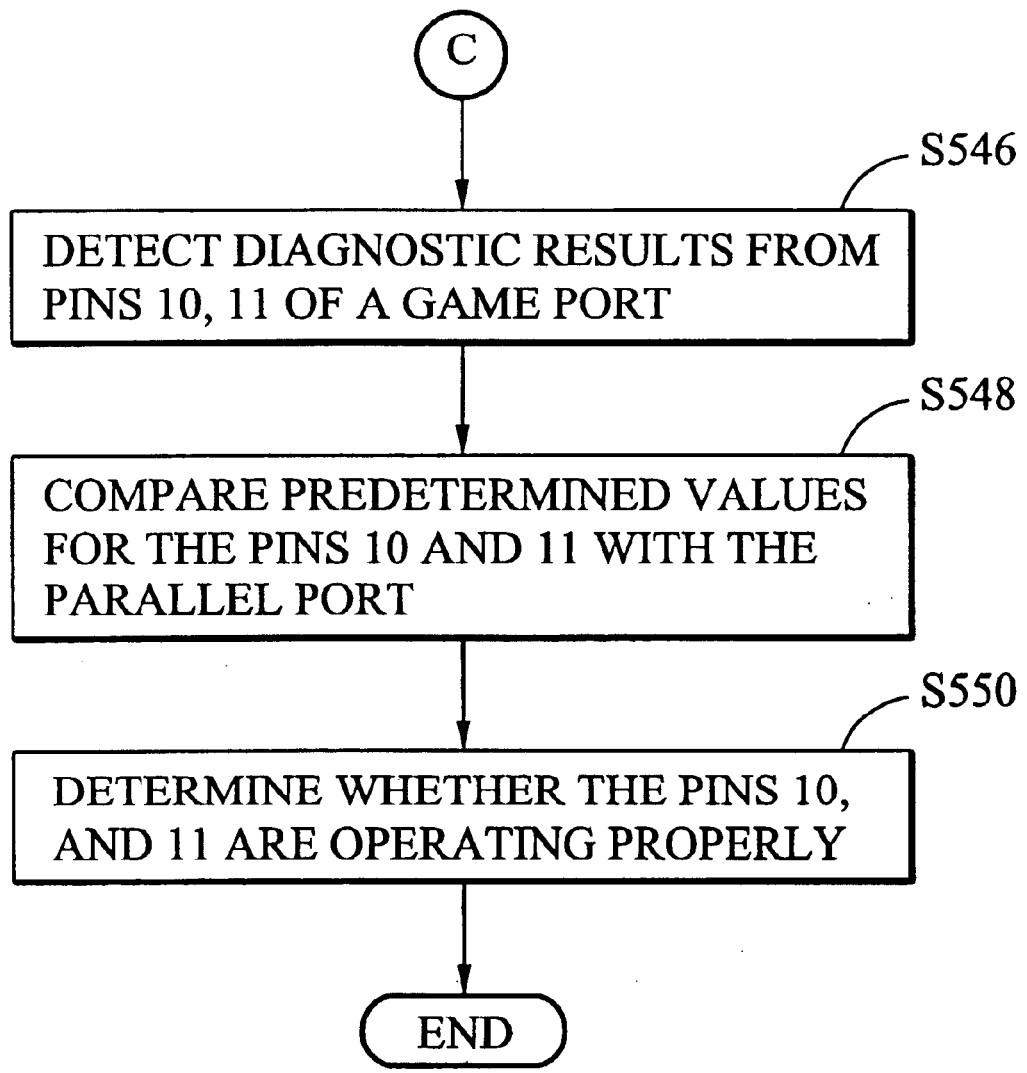

Turning now to FIG. 5D, ACK and BUSY status bits are directly read to detect diagnostic values from the ACK and BUSY status pins of the parallel port 138 (step S546). Next, the ACK and BUSY status bits in the memory block are compared with predetermined values set externally for the parallel port's pins 10 and 11 (step S548). Because pins 10 and 11 of the parallel port 138 are pulled down by the test module 188 on the test apparatus 200, the predetermined values for these pins are set to logic '0'. Accordingly, a comparison between the detected diagnostic values and the predetermined values is determined. The parallel port's pins 10 and 11 are operating correctly if the ACK and BUSY status bits in the memory block and the predetermined values are well-matched; otherwise, the test routine indicates which pin of the parallel port 138 has failed (step S550).

Figure 6A:
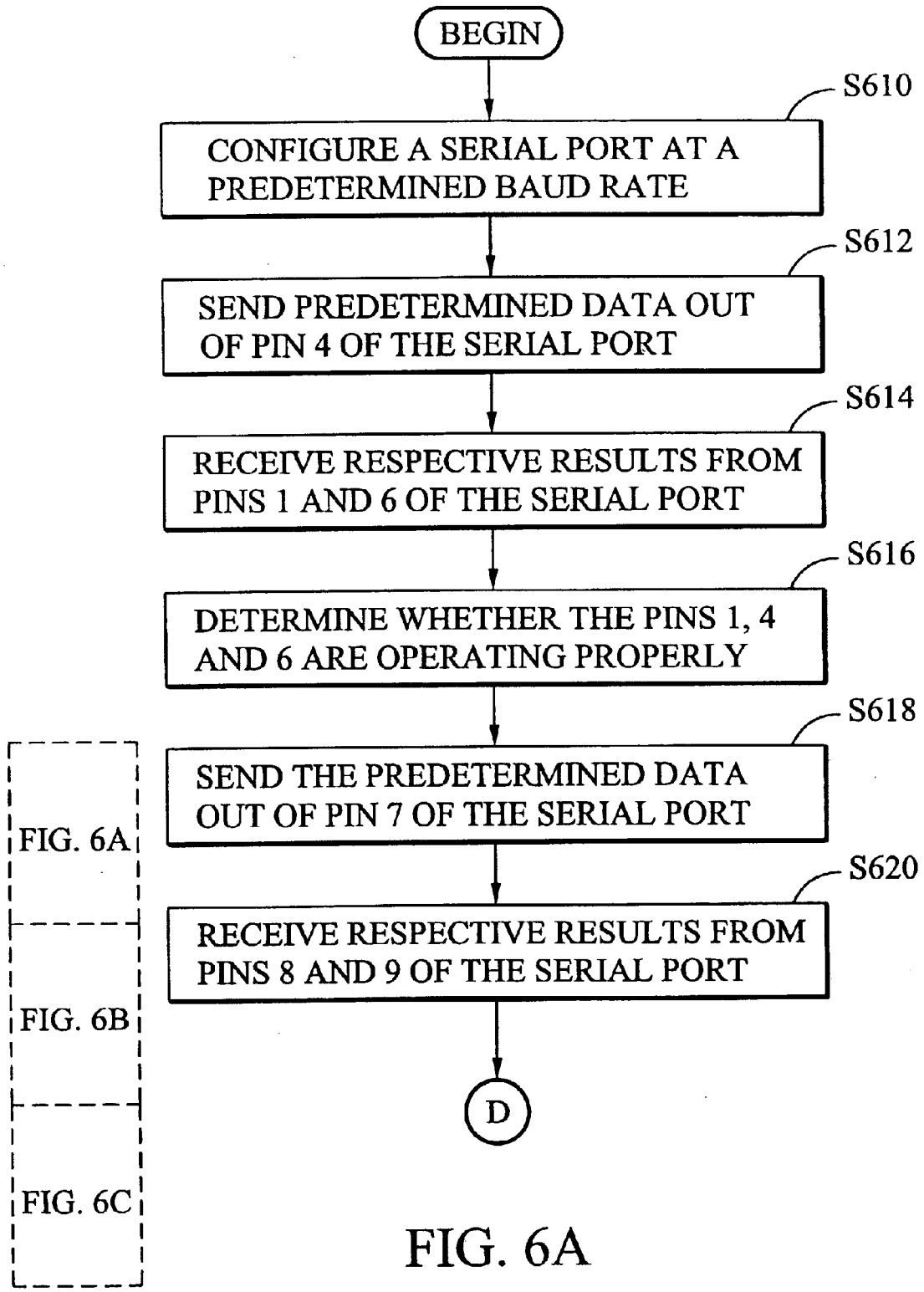
FIGS. 6A–6C show a flowchart illustrating the primary operational steps executed by another test routine for testing the serial port.
Figure 6B:
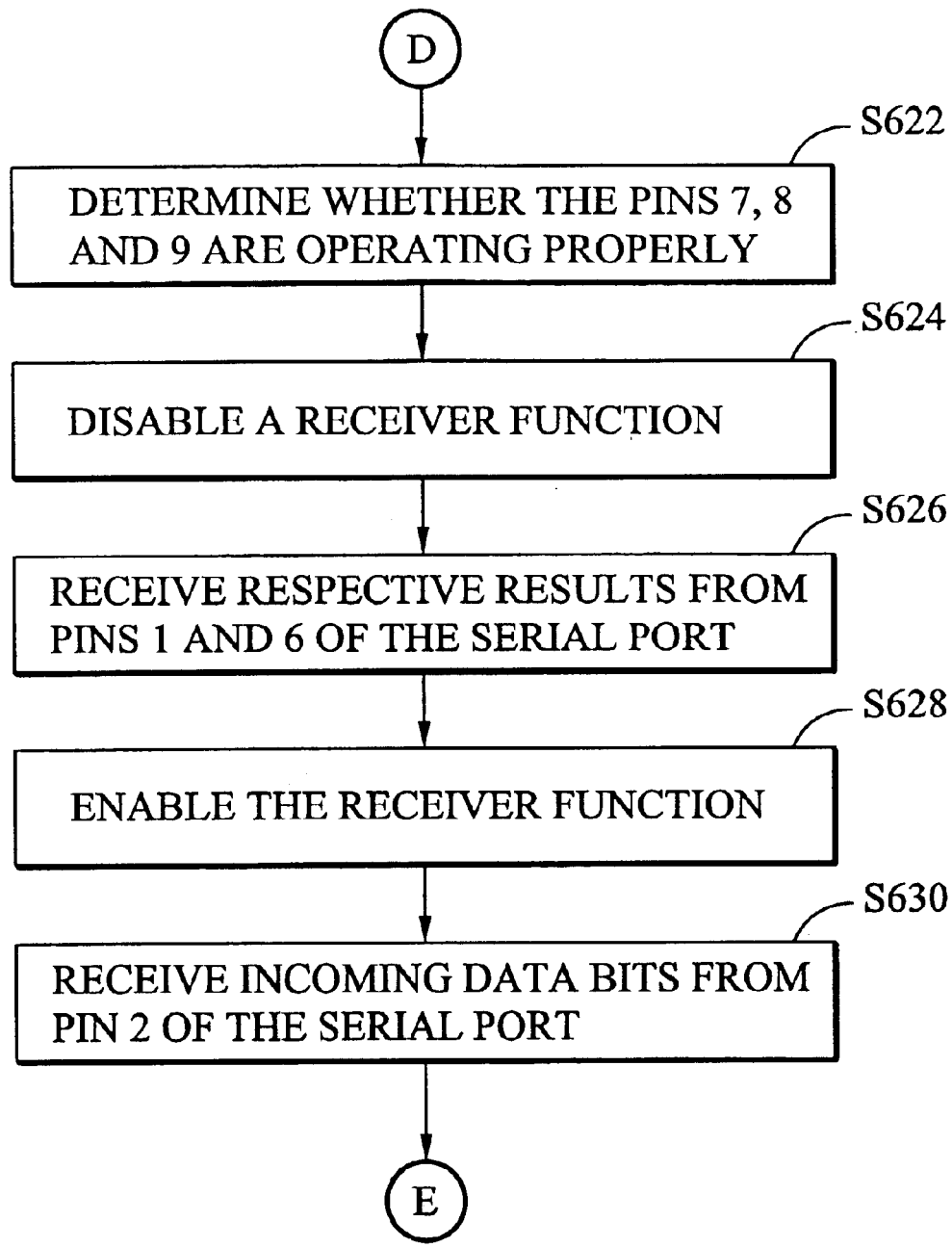

If one of the serial ports 140 and 142 of the DUT 100 is selected, the corresponding test routine for a serial port is performed. First, an I/O base address for the serial port under test is initialized. Note that there are serial port registers within a memory block allocated from the serial port I/O base address. Referring to FIG. 6A, the serial port under test is next configured at a predetermined baud rate (step S610). As illustrated in FIGS. 2E and 2F, three loop-back connections are respectively formed on each of the serial ports 140 and 142 by the test modules 190 and 192. Accordingly, closed loop tests can be performed. A predetermined data bit is written to a DTR control bit in the memory block corresponding to the serial port's DTR control pin such that the predetermined data bit is sent out of pin 4 of the serial port under test (step S612). After a predetermined time, DCD and DSR status bits in the memory block corresponding to the serial port's DCD and DSR status pins are read to receive respective results from pins 1 and 6 of the serial port under test (step S614). The DCD and DSR status bits are separately examined to determine whether they are equal to the predetermined data bit written to the DTR control bit verifying pins 1, 4 and 6 of the serial port under test (step S616). In a similar manner, the predetermined data bit is written to a RTS control bit in the memory block corresponding to the serial port's RTS control pin to send the predetermined data bit out of pin 7 of the serial port under test (step S618). After the predetermined time, CTS and RI status bits in the memory block corresponding to the serial port's CTS and RI status pins are read to receive respective results from pins 8 and 9 of the serial port under test (step S620). Referring to 6B, the CTS and RI status bits are separately examined to determine whether they are equal to the predetermined data bit written to the RTS control bit verifying pins 7, 8 and 9 of the serial port under test (step S622). Operation then proceeds to step S624, where a receiver function related to the serial port under test is disabled. Subsequently, a bit pattern is written to transmitter data bits in the memory block for the serial port's data output pin TXD, thereby transmitting the bit pattern out of pin 3 of the serial port under test (step S626). After the predetermined time, the receiver function related to the serial port under test is enabled (step S628). Then, receiver data bits in the memory block for the serial port's data input pin RXD are read to receive incoming data bits from pin 2 of the serial port under test (step S630).

Figure 6C:
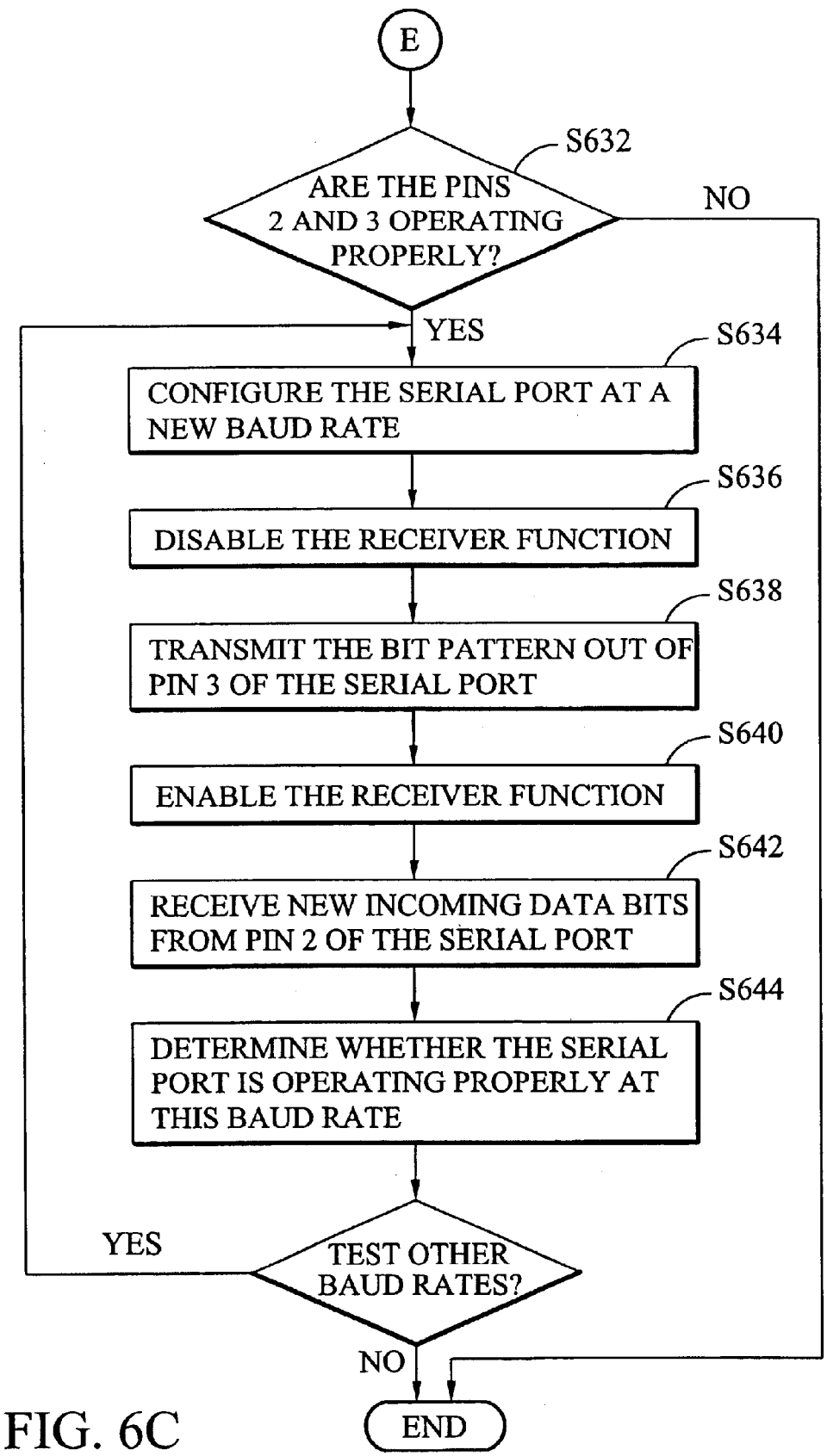

Referring now to FIG. 6C, the received incoming data bits and the transmitted bit pattern are checked to determine whether they are well-matched in order to verify pins 2 and 3 of the serial port under test (step S632). If pins 2 and 3 of the serial port under test are operating properly at the predetermined baud rate, data transmission and receive tests are next performed to verify the transmission and receive capability of the serial port under test at various baud rates. Operation then proceeds to step S634, where the serial port under test is configured at a new baud rate. In a similar manner, the receiver function related to the serial port under test is disabled (step S636). Thereafter, the bit pattern is transmitted out of pin 3 of the serial port under test (step S638). After the predetermined time, the receiver function related to the serial port under test is then enabled (step S640). Next, new incoming data bits are received from pin 2 of the serial port under test (step S630). The new incoming data bits are examined to determine whether they match the transmitted bit pattern or not (step S644). If there are other baud rates to be tested, operation then returns to step S634 to test the serial port for the next baud rate (step S648).

Figure 7:
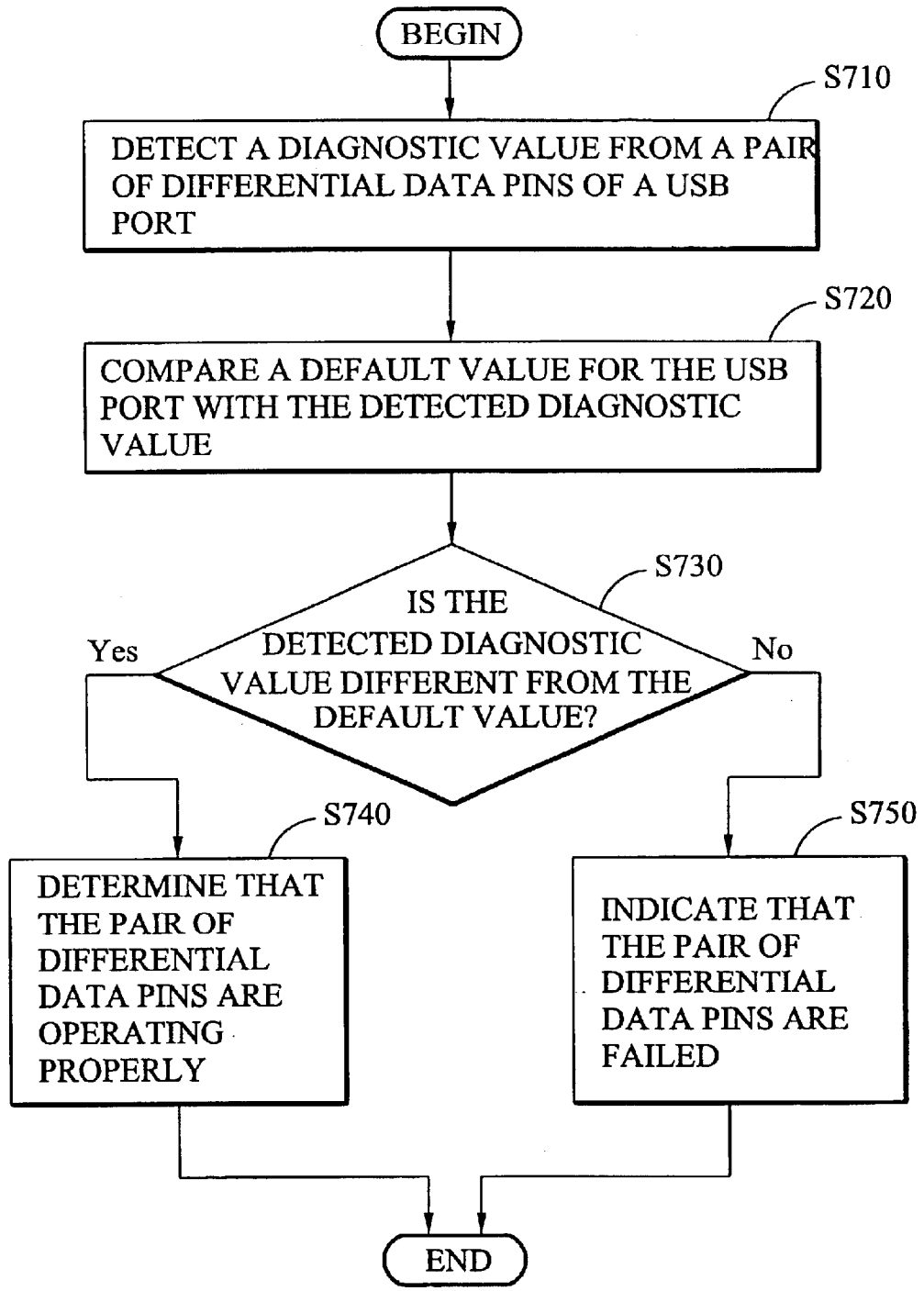
FIG. 7 is a flowchart illustrating the primary operational steps executed by another test routine for testing the USB port.

If one of the USB ports 134 of the DUT 100 is selected, the corresponding test routine for a USB port is performed. Referring to FIG. 7, an I/O base address for the USB port under test is identified and a memory block allocated from the USB port I/O base address is read to detect a diagnostic value from a pair of differential data pins (pins 2 and 3) of the USB port under test (step S710). Note that there are USB port registers within the memory block allocated from the USB port I/O base address. The USB differential data pins are then checked with corresponding bits in the memory block, where the bits directly reflect the current status of the USB differential data pair. Further, the corresponding bits in the memory block are compared with a default value for the USB port under test (step S720). As illustrated in FIG. 2C, since the USB differential data pair are set to a value different from the default value by the test module 184 on the test apparatus 200, the detected diagnostic value from pins 2 and 3 of the USB port under test must differ from the default value for the USB port. Operation then proceeds to step S730, where a comparison between the detected diagnostic value and the default value for the USB port is determined. If the USB port's default value is different from the detected diagnostic value represented by the corresponding bits in the memory block, the differential data pin pair are reported as operating correctly (step S740). Otherwise, the test routine indicates the differential data pin pair have failed (step S750). Because the IEEE 1394 port features high-speed differential signal pairs similar to the USB port, the IEEE 1394 port 136 of the DUT 100 may be tested in a similar manner by the principles of the invention.

Figure 8:
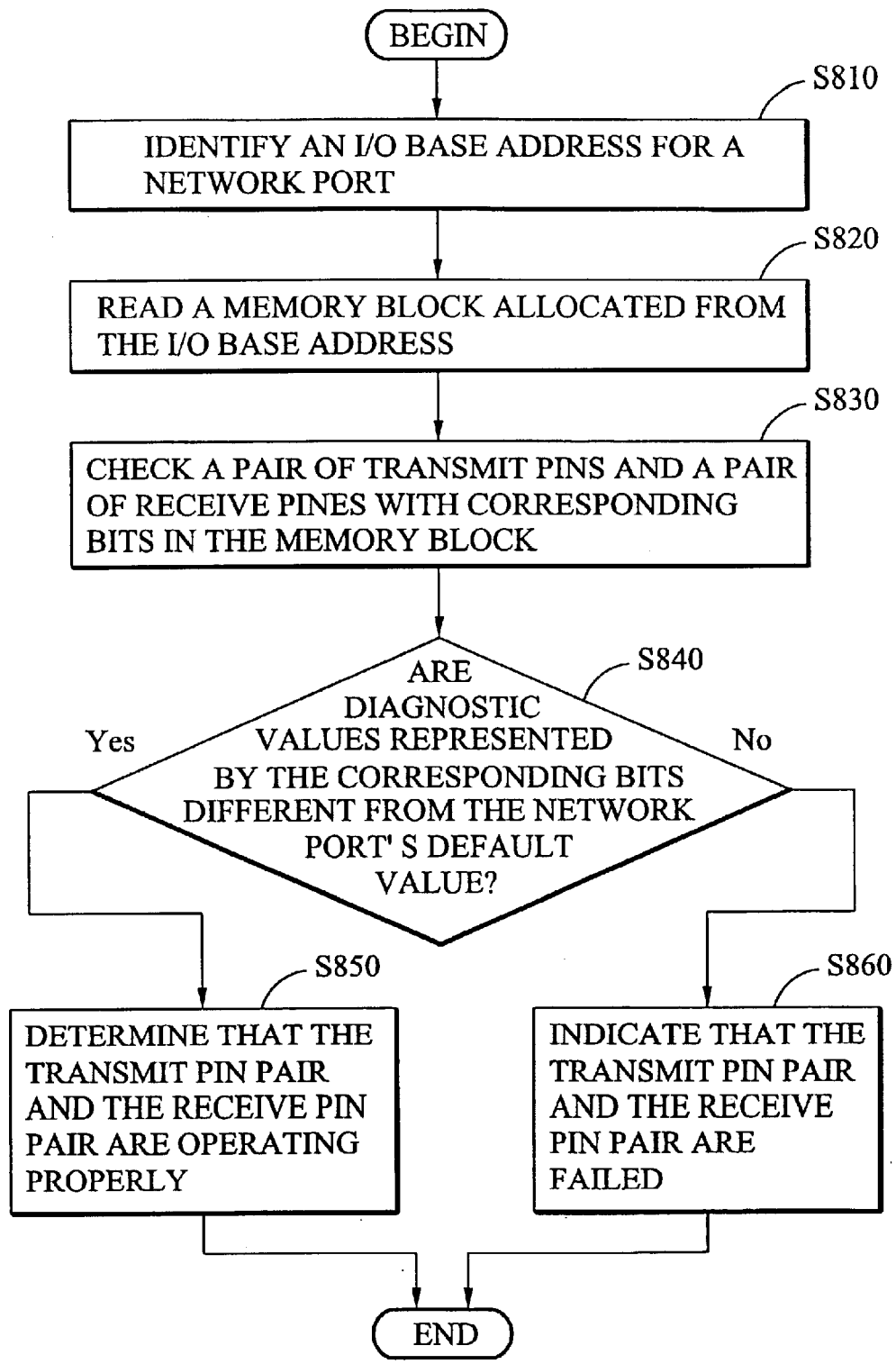
FIG. 8 is a flowchart illustrating the primary operational steps executed by another test routine for testing the network port.

If the network port 148 of the DUT 100 is selected, the corresponding test routine for a network port is performed. First, the PCI bus on the DUT 100 is scanned to find a network controller for the network port 148, and vendor and device identification of the network controller is read. According to the vendor and device identification, the type of the network controller is checked to determine whether it can be supported or not. Referring to FIG. 8, an I/O base address for the network port under test is identified (step S810). Further, a MAC address for the network controller is checked to determine if it is legal. Note that there are network port registers within a memory block allocated from the network port I/O base address. The memory block allocated from the network port I/O base address is read to detect diagnostic values from a pair of transmit pins TX+ and TX− as well as a pair of receive pins RX+ and RX− (step S820). As illustrated in FIG. 2I, a pair of loop-back connections are formed on the network ports 148 by the test module 198. Once the test module 198 is attached to the network port 148 of the DUT 100, the status of the network port 148 is altered. Accordingly, the transmit pins TX+, TX− and the receive pins RX+, RX− of the network port are checked with corresponding bits in the memory block (step S830), where the corresponding bits directly reflect the current status of the transmit pin pair and the receive pin pair. Operation then proceeds to step S840, where comparisons between diagnostic values and default values for the network port are determined. If the network port's default values differ from the detected diagnostic values represented by the corresponding bits in the memory block, the transmit pin pair and the receive pin pair are reported as operating correctly (step S850). Otherwise, the test routine indicates the transmit pin pair and the receive pin pair have failed (step S860).

Figure 9:
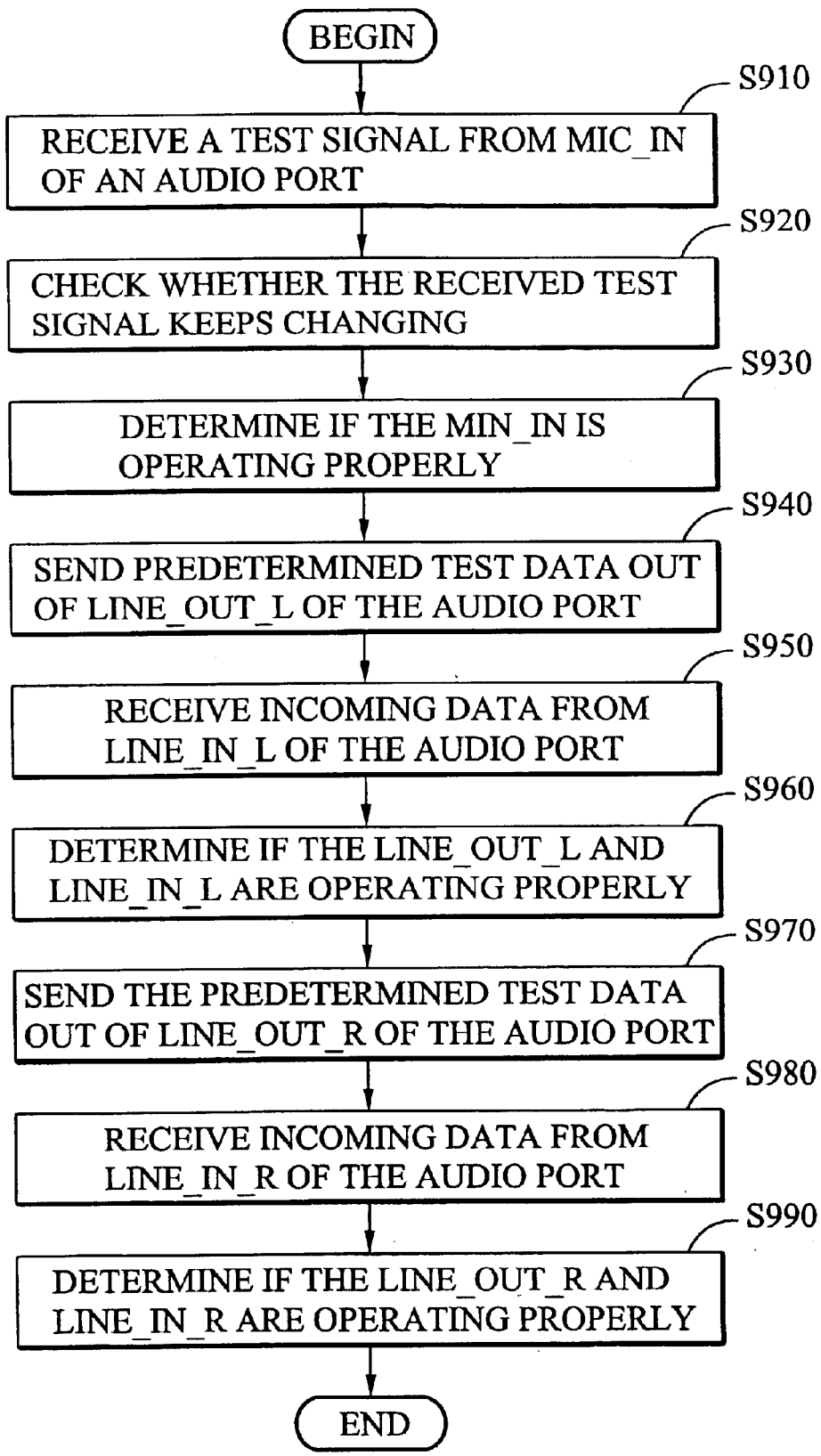
FIG. 9 is a flowchart illustrating the primary operational steps executed by another test routine for testing the audio port.

If the audio port 146 of the DUT 100 is selected, the corresponding test routine for an audio port is performed. Since the audio port 146 includes a microphone input (MIC_IN), a stereo line output (LINE_OUT_L and LINE_OUT_R) and a stereo line input (LINE_IN_L and LINE_INR), the microphone input must be connected to the connector 272 of the test module 196, and the stereo line output and the stereo line input must be linked together, through appropriate cables respectively, before performing the audio port test. As illustrated in FIG. 2H, the audio interface pin of the connector 272 is coupled to the test signal TEST_CLK from the oscillator 274. Turning now to FIG. 9, the MIC_IN of the audio port 146 receives the test signal TEST_CLK from the test module 196 on the test apparatus 200 (step S910). Then, the received test signal at the MIC_IN of the audio port 146 is checked to see whether it continues changing (step S920). If so, the MIC_IN of the audio port 146 is operating correctly (step S930). Operation then proceeds to step S940, where predetermined test data is sent out of the LINE_OUT_L of the audio port 146. After that, incoming data is received from the LINE_IN_L of the audio port 146 (step S950). The predetermined test data is compared with the received incoming data to determine if the LINE_OUT_L and the LINE_IN_L are operating correctly (step S960). Similarly, the predetermined test data is sent out of the LINE_OUT_R of the audio port 146 (step S970). Next, more incoming data is received from the LINE_IN_R of the audio port 146 (step S980), and the predetermined test data is compared with the received incoming data. If the predetermined test data matches the incoming data received from the LINE_IN_R, the LINE_OUT_R and the LINE_IN_R are operating correctly (step S990).

Figure 10:
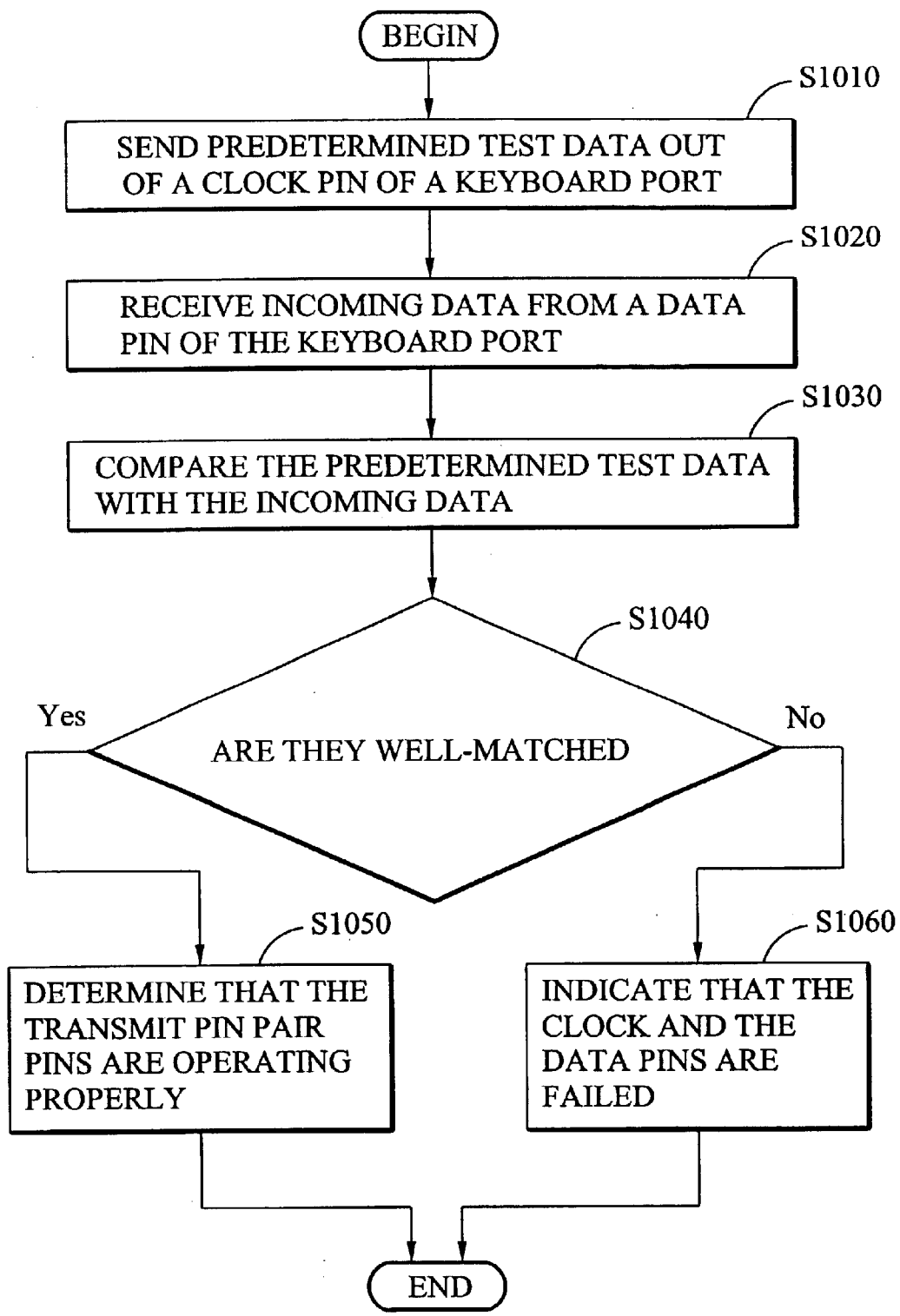
FIG. 10 is a flowchart illustrating the primary operational steps executed by another test routine for testing the keyboard port.

If the keyboard port 130 of the DUT 100 is selected, the corresponding test routine for a keyboard port is performed. Because the clock and the data pins of the keyboard port 130 are connected together to form a loop-back connection through the test module 180 as shown in FIG. 2A, a closed loop test can be performed to verify the keyboard port 130. Referring now to FIG. 10, predetermined test data is sent out of the clock pin of the keyboard port 130 (step S1010). Then, incoming data is received from the data pin of the keyboard port 130 (step S1020). Thereafter, the predetermined test data is compared with the incoming data from the data pin (step S1030). Operation then proceeds to step S1040, where a comparison between the predetermined test data and the incoming data is determined. If the predetermined test data and the incoming data are well-matched, the clock and the data pins of the keyboard port 130 are reported as operating correctly (step S1050). Otherwise, the test routine indicates the clock and the data pins of the keyboard port 130 have failed (step S1060).

Figure 11:
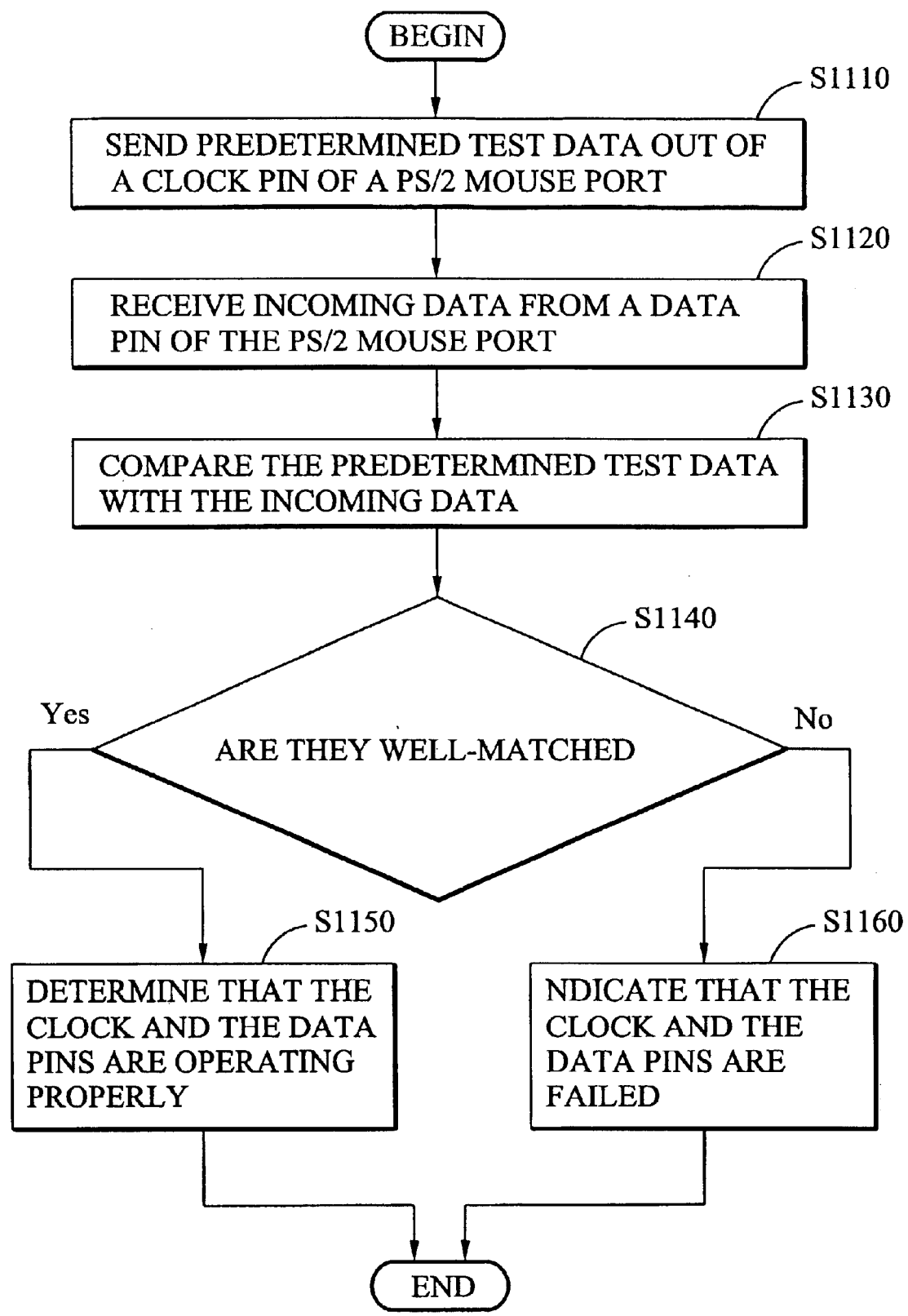
FIG. 11 is a flowchart illustrating the primary operational steps executed by another test routine for testing the PS/2 mouse port.

If the PS/2 mouse port 132 of the DUT 100 is selected, the corresponding test routine for a PS/2 mouse port is performed. Since the clock and the data pins of the PS/2 mouse port 132 are connected together to form a loop-back connection through the test module 182 as shown in FIG. 2B, a closed loop test can be performed to verify the PS/2 mouse port 132. Referring now to FIG. 11, predetermined test data is sent out of the clock pin of the PS/2 mouse port 132 (step S1110). Next, incoming data is received from the data pin of the PS/2 mouse port 132 (step S1120). Subsequently, the predetermined test data is compared with the incoming data from the data pin (step S1130). Operation then proceeds to step S1140, where a comparison between the predetermined test data and the incoming data is determined. If the predetermined test data match the incoming data, the clock and the data pins of the PS/2 mouse port 132 are reported as operating correctly (step S1150). Otherwise, the test routine indicates the clock and the data pins of the PS/2 mouse port 132 have failed (step S1160).

Thus, the present invention provides a method for effectively testing frequently used I/O ports of a computer motherboard. The method according to the invention is simple to allow rapid testing the I/O ports on the basis of each I/O port's characteristics. Moreover, the method of the invention can accurately report which pin of an abnormal I/O port is not operating properly.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for testing I/O ports of a computer motherboard, comprising the steps of:

providing a non-volatile memory on the computer motherboard with a test code for initializing the computer motherboard and testing the I/O ports thereof, in which the test code includes a plurality of test routines corresponding to the I/O ports;

booting the computer motherboard from the test code in the non-volatile memory;

selecting one of the I/O ports to be tested from a display menu;

executing the corresponding test routine for the selected I/O port to test the selected I/O port on the basis of the selected I/O port's characteristics;

displaying a pass message if every signal pin of the selected I/O port is operating correctly; and displaying a failure message to indicate which signal pin of the selected I/O port is not operating correctly if there is an abnormal signal pin in the selected I/O port.

2. The method as recited in claim 1 wherein the selected I/O port under test is a game port of the computer motherboard.

3. The method as recited in claim 2 wherein the step of executing the corresponding test routine further comprises:

detecting corresponding diagnostic values from respective game interface pins of the game port;

comparing predetermined values set externally for the respective game interface pins of the game port with the detected diagnostic values; and if the detected diagnostic values and the predetermined values are well-matched, determining that all of the game interface pins are operating correctly.

4. The method as recited in claim 3 wherein the game port supports two joystick connections each of which has the game interface pins including a first button input pin, a second button input pin, an X-axis position input pin and a Y-axis position input pin.

5. The method as recited in claim 1 wherein the selected I/O port under test is a parallel port of the computer motherboard.

6. The method as recited in claim 5 wherein the step of executing the corresponding test routine further comprises:

(a) sending a first bit pattern out of a first portion of parallel interface data pins of the parallel port;

(b) receiving a first result from a first parallel interface status pin of the parallel port after a predetermined time to check the first parallel interface status pin based on the relationship between the received first result and the sent first bit pattern;

(c) sending a set of second bit patterns one at a time out of the first portion of the parallel interface data pins of the parallel port;

(d) after the predetermined time, receiving one second result at a time from the first parallel interface status pin of the parallel port;

(e) repeating the steps (c) through (d) to check every parallel interface data pin in the first portion of the parallel interface data pins based on the relationship between the second result received each time in the step (d) and the corresponding second bit pattern;

(f) sending the first bit pattern out of a second portion of parallel interface data pins of the parallel port;

(g) receiving a third result from a second parallel interface status pin of the parallel port after the predetermined time to check the second parallel interface status pin based on the relationship between the received third result and the sent first bit pattern;

(h) sending the set of second bit patterns one at a time out of the second portion of the parallel interface data pins of the parallel port;

(i) after the predetermined time, receiving one fourth result at a time from the second parallel interface status pin of the parallel port;

(j) repeating the steps (h) through (i) to check every parallel interface data pin in the second portion of the parallel interface data pins based on the relationship between the fourth result received each time in the step (i) and the corresponding second bit pattern;

(k) sending the first bit pattern out of a set of parallel interface control pins of the parallel port;

(l) receiving a fifth result from a third parallel interface status pin of the parallel port after the predetermined time to check the third parallel interface status pin based on the relationship between the received fifth result and the sent first bit pattern;

(m) sending the set of second bit patterns one at a time out of the set of the parallel interface control pins of the parallel port;

(n) after the predetermined time, receiving one sixth result at a time from the third parallel interface status pin of the parallel port;

(o) repeating the steps (m) through (n) to check every parallel interface control pin in the set of the parallel interface control pins based on the relationship between the sixth result received each time in the step (n) and the corresponding second bit pattern;

(p) detecting a seventh and eighth result from a fourth and fifth parallel interface status pin of the parallel port;

(q) comparing predetermined values set externally for the fourth and the fifth parallel interface status pins with the detected seventh and the eighth results; and (r) if the seventh and the eighth results match the predetermined values, determining that the fourth and the fifth parallel interface status pins of the parallel port are operating correctly.

7. The method as recited in claim 6 wherein the first parallel interface status pin is a P/E status pin, the second parallel interface status pin is a SELECT status pin, the third parallel interface status pin is an ERROR status pin, the fourth parallel interface status pin is an ACK status pin, and the fifth parallel interface status pin is a BUSY status pin.

8. The method as recited in claim 6 wherein the first portion and the second portion of the parallel interface data pins constitute eight DATA pins of the parallel port.

9. The method as recited in claim 6 wherein the set of the parallel interface control pins includes a SLIN control pin, an INIT control pin, an A/F control pin, and a STROBE control pin.

10. The method as recited in claim 1 wherein the selected I/O port under test is a serial port of the computer motherboard.

11. The method as recited in claim 10 wherein the step of executing the corresponding test routine further comprises:

configuring the serial port at a predetermined baud rate;

sending predetermined data out of a first serial interface control pin of the serial port;

receiving a first and second result from a first and second serial interface status pin of the serial port after a predetermined time;

respectively checking whether the first and the second results are equal to the predetermined data, verifying the first and the second serial interface status pins and the first serial interface control pin;

sending the predetermined data out of a second serial interface control pin of the serial port;

receiving a third and fourth result from a third and fourth serial interface status pin of the serial port after the predetermined time;

respectively checking whether the third and the fourth results are equal to the predetermined data, verifying the third and the fourth serial interface status pins and the second serial interface control pin;

disabling a receiver function related to the serial port under test;

transmitting a bit pattern out of a serial data output pin of the serial port;

enabling the receiver function related to the serial port under test after the predetermined time;

receiving incoming data bits from a serial data input pin of the serial port; and checking whether the incoming data bits and the bit pattern are well-matched verifying the serial data input pin and the serial data output pin.

12. The method as recited in claim 11 wherein the first serial interface control pin is a DTR pin of the serial port and the second serial interface control pin is a RTS pin of the serial port.

13. The method as recited in claim 11 wherein the first serial interface status pin is a DCD pin of the serial port, the second serial interface status pin is a DSR pin of the serial port, the third serial interface status pin is a CTS pin of the serial port, and the fourth serial interface status pin is a RI pin of the serial port.

14. The method as recited in claim 11 wherein the serial data output pin is a TXD pin of the serial port and the serial data input pin is a RXD pin of the serial port.

15. The method as recited in claim 14 further comprising the steps of:
   if the TXD and the RXD pins are operating correctly, performing the following steps:
   (a) configuring the serial port at a new baud rate;
   (b) disabling the receiver function related to the serial port under test;
   (c) transmitting the bit pattern out of the TXD pin of the serial port;
   (d) enabling the receiver function related to the serial port under test after the predetermined time;
   (e) receiving new incoming data bits from the RXD pin of the serial port;
   (f) checking whether the new incoming data bits and the bit pattern are well-matched, verifying the serial port under test for the new baud rate; and
   (g) repeating the steps (a) through (f) until all of the configurable baud rates for the serial port are tested.

16. The method as recited in claim 1 wherein the selected I/O port under test is a universal serial bus (USB) port of the computer motherboard.

17. The method as recited in claim 16 wherein the step of executing the corresponding test routine further comprises:
   detecting a diagnostic value from a pair of differential data pins of the USB port;
   comparing a default value for the USB port with the detected diagnostic value; and
   if the detected diagnostic value is different from the default value for the USB port, determining that the pair of differential data pins of the USB port are operating correctly.

18. The method as recited in claim 1 wherein the selected I/O port under test is a network port of the computer motherboard.

19. The method as recited in claim 18 wherein the step of executing the corresponding test routine further comprises:
   loopback-connecting a pair of transmit pins of the network port to a pair of receive pins of the network port;
   identifying an I/O base address for the network port;
   reading a memory block allocated from the network port I/O base address;
   checking the transmit pins and the receive pins with corresponding bits in the memory block where the corresponding bits directly reflect the current status of the pair of transmit pins and the pair of receive pins; and
   if diagnostic values represented by the corresponding bits in the memory block are different from the network port's default values, determining that the pair of transmit pins and the pair of receive pins are operating correctly.

20. The method as recited in claim 1 wherein the selected I/O port under test is an audio port of the computer motherboard.

21. The method as recited in claim 20 wherein the step of executing the corresponding test routine further comprises:
   receiving a test signal from a first audio input pin of the audio port;
   checking whether the received test signal continues changing;
   determining that the first audio input pin is operating correctly if the received test signal continues changing;
   sending predetermined test data out of a first output pin of the audio port;
   receiving first incoming data from a second audio input pin of the audio port;
   comparing the predetermined test data with the first incoming data;
   if the predetermined test data matches the first incoming data, determining that the first output and the second audio input pins are operating correctly; and
   sending the predetermined test data out of a second output pin of the audio port;
   receiving second incoming data from a third audio input pin of the audio port;
   comparing the predetermined test data with the second incoming data; and
   if the predetermined test data matches the second incoming data, determining that the second output and the third audio input pins are operating correctly.

22. The method as recited in claim 21 wherein the first input output pin is a microphone pin of the audio port, the first and the second output pins form a pair of stereo output pins of the audio port, and the second and the third audio input pins form a pair of stereo input pins of the audio port.

23. The method as recited in claim 1 wherein the selected I/O port under test is a keyboard port of the computer motherboard.

24. The method as recited in claim 23 wherein the step of executing the corresponding test routine further comprises:
   sending predetermined test data out of a clock pin of the keyboard port;
   receiving incoming data from a data pin of the keyboard port;
   comparing the predetermined test data with the incoming data; and
   if the predetermined test data matches the incoming data, determining that the clock and the data pins of the keyboard port are operating correctly.

25. The method as recited in claim 1 wherein the selected I/O port under test is a PS/2 mouse port of the computer motherboard.

26. The method as recited in claim 25 wherein the step of executing the corresponding test routine further comprises:

sending predetermined test data out of a clock pin of the PS/2 mouse port;

receiving incoming data from a data pin of the PS/2 mouse port;

comparing the predetermined test data with the incoming data; and if the predetermined test data matches the incoming data, determining that the clock and the data pins of the PS/2 mouse port are operating correctly.

27. A method for testing I/O ports of a computer motherboard having a central processing unit (CPU) and a non-volatile memory storing a basic input-output system (BIOS) code, the method comprising the steps of:

providing the non-volatile memory with a test code instead of the BIOS code for initializing the computer motherboard and testing the I/O ports thereof, in which the test code includes a plurality of test routines corresponding to the I/O ports;

booting the CPU from the test code in the non-volatile memory whereby the CPU executes the test code to test the I/O ports of the computer motherboard;

interactively selecting one of the I/O ports to be tested from a display menu;

executing the corresponding test routine for the selected I/O port to test the selected I/O port on the basis of the selected I/O port's characteristics;

displaying a pass message if every signal pin of the selected I/O port is operating correctly; and displaying a failure message to indicate which signal pin of the selected I/O port is not operating correctly if there is an abnormal signal pin in the selected I/O port.

28. The method as recited in claim 27 wherein the selected I/O port under test is a game port of the computer motherboard.

29. The method as recited in claim 28 wherein the step of executing the corresponding test routine further comprises:

initializing an I/O base address for the game port;

reading a memory block allocated from the game port I/O base address;

checking every game interface pin of the game port with corresponding bits in the memory block where the bits directly reflect the current status of the game interface pins under check;

comparing predetermined values set externally for the respective game interface pins of the game port with the corresponding bits in the memory block; and if the corresponding bits in the memory block and the predetermined values are well-matched, determining that all the game interface pins are operating correctly.

30. The method as recited in claim 29 wherein the game port supports two joystick connections each of which has the game interface pins including a first button input pin, a second button input pin, an X-axis position input pin and a Y-axis position input pin.

31. The method as recited in claim 27 wherein the selected I/O port under test is a parallel port of the computer motherboard.

32. The method as recited in claim 31 wherein the step of executing the corresponding test routine further comprises:

(a) initializing an I/O base address for the parallel port;

(b) writing a first bit pattern to a first portion of data bits in a memory block corresponding to a first portion of parallel interface data pins of the parallel port, in which the memory block is allocated from the parallel port I/O base address;

(c) reading a first status bit in the memory block corresponding to a first parallel interface status pin of the parallel port after a predetermined time to check the first parallel interface status pin based on the relationship between the first status bit read from the memory block and the first bit pattern;

(d) writing a set of second bit patterns one at a time to the first portion of the data bits in the memory block corresponding to the first portion of the parallel interface data pins of the parallel port;

(e) reading the first status bit in the memory block corresponding to the first parallel interface status pin of the parallel port after the predetermined time;

(f) repeating the steps (d) through (e) to check every parallel interface data pin in the first portion of the parallel interface data pins based on the relationship between the first status bit read each time in the step (e) and the corresponding second bit pattern;

(g) writing the first bit pattern to a second portion of the data bits in the memory block corresponding to a second portion of the parallel interface data pins of the parallel port;

(h) reading a second status bit in the memory block corresponding to a second parallel interface status pin of the parallel port after the predetermined time to check the second parallel interface status pin based on the relationship between the second status bit read from the memory block and the first bit pattern;

(i) writing the set of second bit patterns one at a time to the second portion of the data bits in the memory block corresponding to the second portion of the parallel interface data pins of the parallel port;

(j) reading the second status bit in the memory block corresponding to the second parallel interface status pin of the parallel port after the predetermined time;

(k) repeating the steps (i) through (j) to check every parallel interface data pin in the second portion of the parallel interface data pins based on the relationship between the second status bit read each time in the step (j) and the corresponding second bit pattern;

(l) writing the first bit pattern to a set of control bits in the memory block corresponding to a set of parallel interface control pins of the parallel port;

(m) reading a third status bit in the memory block corresponding to a third parallel interface status pin of the parallel port after the predetermined time to check the third parallel interface status pin based on the relationship between the third status bit read from the memory block and the first bit pattern;

(n) writing the set of second bit patterns one at a time to the set of the control bits in the memory block corresponding to the set of the parallel interface control pins of the parallel port;

(o) reading the third status bit in the memory block corresponding to the third parallel interface status pin of the parallel port after the predetermined time;

(p) repeating the steps (n) through (o) to check every parallel interface control pin in the set of the parallel interface control pins based on the relationship between the third status bit read each time in the step (o) and the corresponding second bit pattern;

(q) directly reading a fourth and fifth status bit in the memory block corresponding to a fourth and fifth parallel interface status pin of the parallel port;

(r) comparing predetermined values set externally for the fourth and the fifth parallel interface status pins with the fourth and the fifth status bits in the memory block; and (s) if the fourth and the fifth status bits in the memory block and the predetermined values are well-matched, determining that the fourth and the fifth parallel interface status pins of the parallel port are operating correctly.

33. The method as recited in claim 32 wherein the first parallel interface status pin is a P/E status pin, the second parallel interface status pin is a SELECT status pin, the third parallel interface status pin is an ERROR status pin, the fourth parallel interface status pin is an ACK status pin, and the fifth parallel interface status pin is a BUSY status pin.

34. The method as recited in claim 32 wherein the first portion and the second portion of the parallel interface data pins constitute eight DATA pins of the parallel port.

35. The method as recited in claim 32 wherein the set of the parallel interface control pins includes a SLIN control pin, an INIT control pin, an A/F control pin, and a STROBE control pin.

36. The method as recited in claim 27 wherein the selected I/O port under test is a serial port of the computer motherboard.

37. The method as recited in claim 36 wherein the step of executing the corresponding test routine further comprises:
    initializing an I/O base address for the serial port;
    configuring the serial port at a predetermined baud rate;
    writing a predetermined data bit to a first serial interface control bit in a memory block corresponding to a first serial interface control pin of the serial port, in which the memory block is allocated from the serial port I/O base address;
    reading a first and second serial interface status bit in the memory block corresponding to a first and second serial interface status pin of the serial port after a predetermined time;
    respectively checking whether the first and the second serial interface status bits are equal to the predetermined data bit written to the first serial interface control bit, verifying the first and the second serial interface status pins and the first serial interface control pin;
    writing the predetermined data bit to a second serial interface control bit in the memory block corresponding to a second serial interface control pin of the serial port;
    reading a third and fourth serial interface status bit in the memory block corresponding to a third and fourth serial interface status pin of the serial port after the predetermined time;
    respectively checking whether the third and the fourth serial interface status bits are equal to the predetermined data bit written to the second serial interface control bit, verifying the third and the fourth serial interface status pins and the second serial interface control pin;
    disabling a receiver function related to the serial port under test;
    writing a bit pattern to transmitter data bits in the memory block for a serial data output pin of the serial port;
    enabling the receiver function related to the serial port under test after the predetermined time;
    reading receiver data bits in the memory block for a serial data input pin of the serial port; and
    checking whether the receiver data bits in the memory block and the bit pattern are well-matched verifying the serial data input pin and the serial data output pin.

38. The method as recited in claim 37 wherein the first serial interface control pin is a DTR pin of the serial port and the second serial interface control pin is a RTS pin of the serial port.

39. The method as recited in claim 37 wherein the first serial interface status pin is a DCD pin of the serial port, the second serial interface status pin is a DSR pin of the serial port, the third serial interface status pin is a CTS pin of the serial port, and the fourth serial interface status pin is a RI pin of the serial port.

40. The method as recited in claim 37 wherein the serial data output pin is a TXD pin of the serial port and the serial data input pin is a RXD pin of the serial port.

41. The method as recited in claim 40 further comprising the steps of:
    if the TXD and the RXD pins are operating correctly, then performing the following steps:
        (a) configuring the serial port at a new baud rate;
        (b) disabling the receiver function related to the serial port under test;
        (c) writing the bit pattern to the transmitter data bits in the memory block for the TXD pin of the serial port;
        (d) enabling the receiver function related to the serial port under test after the predetermined time;
        (e) reading the receiver data bits in the memory block for the RXD pin of the serial port;
        (f) checking whether the receiver data bits in the memory block and the bit pattern are well-matched verifying the serial port under test for the new baud rate; and
        (g) repeating the steps (a) through (f) until all of the configurable baud rates for the serial port are tested.

42. The method as recited in claim 27 wherein the selected I/O port under test is a universal serial bus (USB) port of the computer motherboard.

43. The method as recited in claim 42 wherein the step of executing the corresponding test routine further comprises:
    identifying an I/O base address for the USB port;
    reading a memory block allocated from the USB port I/O base address;
    checking a pair of differential data pins of the USB port with corresponding bits in the memory block where the corresponding bits directly reflect the current status of the pair of differential data pins; and
    if a diagnostic value represented by the corresponding bits in the memory block is different from the USB port's default value, determining that the pair of differential data pins of the USB port are operating correctly.

44. The method as recited in claim 27 wherein the selected I/O port under test is a network port of the computer motherboard.

45. The method as recited in claim 44 wherein the step of executing the corresponding test routine further comprises:
    loopback-connecting a pair of transmit pins of the network port to a pair of receive pins of the network port;
    scanning a peripheral bus to find a network controller for the network port of the computer motherboard;
    reading a vendor identification and a device identification of the network controller;
    determining if the type of the network controller can be supported in accordance with the vendor identification and the device identification;
    identifying an I/O base address for the network port;
    checking whether a MAC address for the network controller is legal;
    reading a memory block allocated from the network port I/O base address;
    checking the transmit pins and the receive pins with corresponding bits in the memory block where the corresponding bits directly reflect the current status of the pair of transmit pins and the pair of receive pins; and if diagnostic values represented by the corresponding bits in the memory block are different from the network port's default values, determining that the pair of transmit pins and the pair of receive pins are operating correctly.

46. The method as recited in claim 27 wherein the selected I/O port under test is an audio port of the computer motherboard.

47. The method as recited in claim 46 wherein the step of executing the corresponding test routine further comprises:

receiving a test signal from a first audio input pin of the audio port;

checking whether the received test signal continues changing;

determining that the first audio input pin is operating correctly if the received test signal continues changing;

sending predetermined test data out of a first output pin of the audio port;

receiving first incoming data from a second audio input pin of the audio port;

comparing the predetermined test data with the first incoming data;

if the predetermined test data matches the first incoming data, determining that the first output and the second audio input pins are operating correctly; and sending the predetermined test data out of a second output pin of the audio port;

receiving second incoming data from a third audio input pin of the audio port;

comparing the predetermined test data with the second incoming data; and if the predetermined test data matches the second incoming data, determining that the second output and the third audio input pins are operating correctly.

48. The method as recited in claim 47 wherein the first input output pin is a microphone pin of the audio port, the first and the second output pins form a pair of stereo output pins of the audio port, and the second and the third audio input pins form a pair of stereo input pins of the audio port.

* * * * *